United States Patent
Ostroff

(10) Patent No.: US 9,110,673 B2
(45) Date of Patent: *Aug. 18, 2015

(54) SYSTEM AND METHOD OF CREATING AND REMOTELY EDITING INTERACTIVE GENERIC CONFIGURATOR PROGRAMS

(76) Inventor: Daniel Reuven Ostroff, Petach Tikva (IL)

( * ) Notice: Subject to any disclaimer, the term of this patent is extended or adjusted under 35 U.S.C. 154(b) by 328 days.

This patent is subject to a terminal disclaimer.

(21) Appl. No.: 13/557,705

(22) Filed: Jul. 25, 2012

(65) Prior Publication Data

US 2012/0290429 A1 Nov. 15, 2012

Related U.S. Application Data

(63) Continuation-in-part of application No. 12/872,296, filed on Aug. 31, 2010, now Pat. No. 8,516,392.

(60) Provisional application No. 61/511,985, filed on Jul. 26, 2011, provisional application No. 61/585,730, filed on Jan. 12, 2012, provisional application No. 61/674,831, filed on Jul. 23, 2011.

(51) Int. Cl.
G06F 3/0481 (2013.01)
G06F 9/44 (2006.01)
G06Q 30/06 (2012.01)

(52) U.S. Cl.
CPC .............. *G06F 8/34* (2013.01); *G06Q 30/0621* (2013.01); *G06Q 30/0643* (2013.01)

(58) Field of Classification Search
CPC .................................................... G06F 3/0481
USPC ....................................................... 715/800
See application file for complete search history.

(56) References Cited

U.S. PATENT DOCUMENTS

| | | | | |
|---|---|---|---|---|
| 7,353,192 | B1 * | 4/2008 | Ellis et al. | 705/26.5 |
| 7,843,466 | B2 * | 11/2010 | Hanechak | 345/619 |
| 7,946,490 | B2 * | 5/2011 | Elgar et al. | 235/462.01 |
| 8,174,521 | B2 * | 5/2012 | Harvill et al. | 345/419 |
| 8,331,677 | B2 * | 12/2012 | Foehr et al. | 382/181 |
| 8,405,679 | B2 * | 3/2013 | Murtagh | 345/629 |
| 8,418,070 | B2 * | 4/2013 | Mayer-Ullmann | 715/763 |
| 8,516,392 | B2 * | 8/2013 | Ostroff | 715/800 |
| 2002/0013782 | A1 * | 1/2002 | Ostroff et al. | 707/10 |
| 2003/0139840 | A1 * | 7/2003 | Magee et al. | 700/133 |
| 2005/0027553 | A1 * | 2/2005 | Samet | 705/1 |
| 2005/0102199 | A1 * | 5/2005 | Lee | 705/27 |
| 2007/0024908 | A1 * | 2/2007 | Hanechak | 358/1.18 |
| 2007/0024909 | A1 * | 2/2007 | Hanechak | 358/1.18 |

(Continued)

*Primary Examiner* — Reza Nabi
(74) *Attorney, Agent, or Firm* — Stephen E. Zweig

(57) ABSTRACT

Item configurators for websites and other applications, using a plurality of graphic layer files and graphic layer thumbnail files comprising various layers of the item desired for configuration. Generally at least some of this plurality of graphic layer files will contain some transparent pixels. The method also involves creating at least one main description file, which may be in XML format, or a CSV row and column table format, suitable for editing by spreadsheet, which describes the relationships between this plurality of graphic layer files. An interactive generic configurator program (IGCP) that is capable of reading and parsing this main description file, and displaying icons on the GUI that are representative of various user configurator selections will then be used to implement the configurator, often within a web browser over the internet. Additionally, methods of allowing unskilled users to remotely edit such configurator files using standard web browsers are disclosed.

11 Claims, 30 Drawing Sheets

(56) References Cited

U.S. PATENT DOCUMENTS

| | | | |
|---|---|---|---|
| 2007/0294129 A1* | 12/2007 | Froseth et al. | 705/10 |
| 2009/0147297 A1* | 6/2009 | Stevenson | 358/1.15 |
| 2010/0079480 A1* | 4/2010 | Murtagh | 345/592 |
| 2010/0088618 A1* | 4/2010 | Mayer-Ullmann | 715/763 |
| 2010/0172590 A1* | 7/2010 | Foehr et al. | 382/217 |
| 2011/0091133 A1* | 4/2011 | Hanechak | 382/298 |
| 2012/0054075 A1* | 3/2012 | Ostroff | 705/27.2 |
| 2012/0290429 A1* | 11/2012 | Ostroff | 705/26.5 |

* cited by examiner

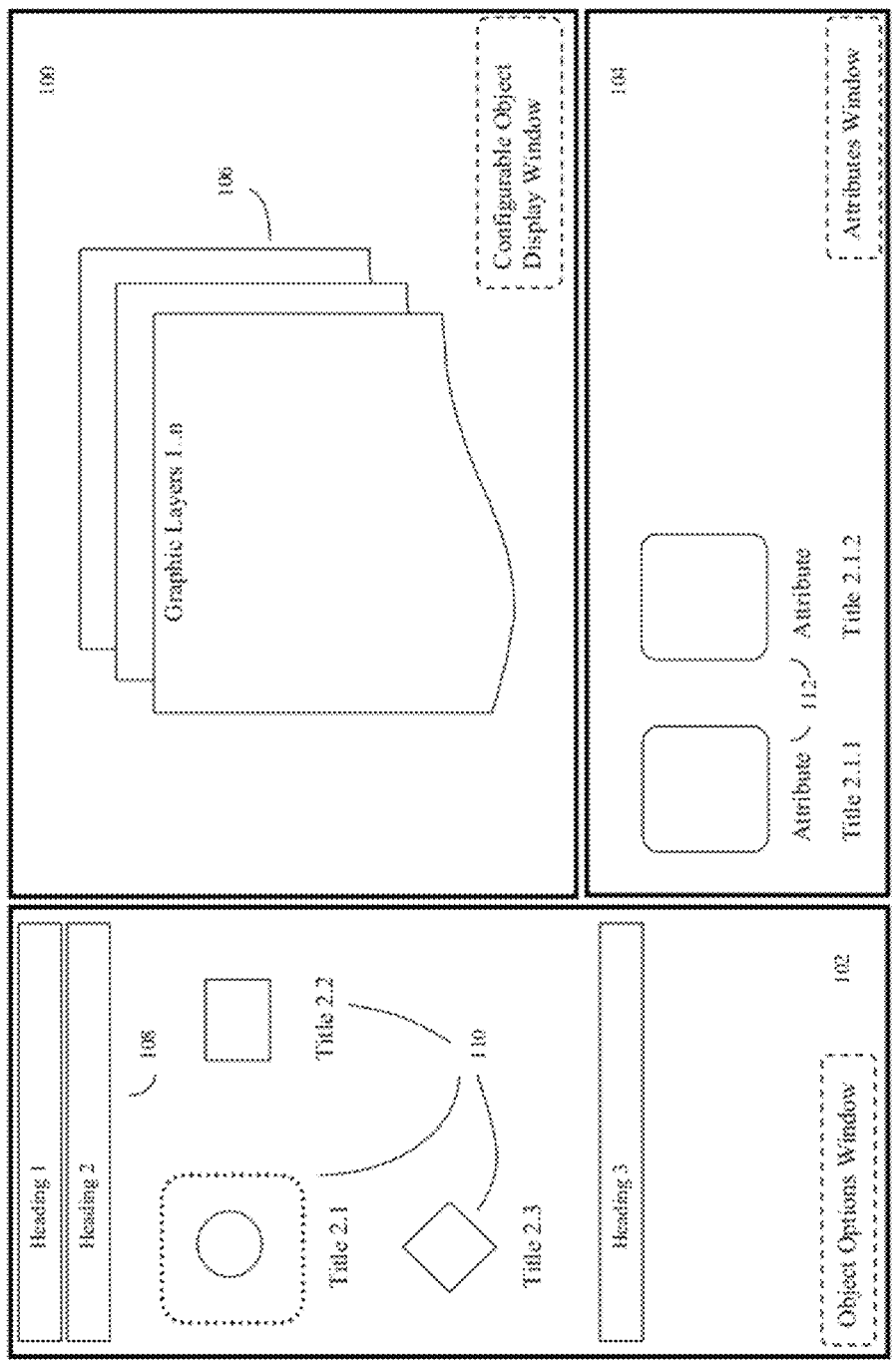

Figure 2

```xml
<?xml version="1.0"?>
<description>
<heading title="Door Design">
    <assembly Pic="/door/standard.png" Thumb="/doorThumbs/standard.png" Title="standard"
Attributes="None"></assembly>
    <assembly Pic="/door/premium.png" Thumb="/doorThumbs/premium.png" Title="premium"
Attributes="None"></assembly>
    </heading>
    <heading title="Upper Window">
        <assembly Pic="/door/circle.png" Thumb="/doorThumbs/circle.png" Title="circle"
Attributes="glassTypes.xml"></assembly>
        <assembly Pic="/door/square.png" Thumb="/doorThumbs/square.png" Title="square"
Attributes="glassTypes.xml"></assembly>
        <assembly Pic="/door/diamond.png" Thumb="/doorThumbs/diamond.png" Title="diamond"
Attributes="glassTypes.xml"></assembly>
        <assembly Pic="/door/sun.png" Thumb="/doorThumbs/sun.png" Title="sun"
Attributes="glassTypes.xml"></assembly>
        <assembly Pic="/door/star.png" Thumb="/doorThumbs/star.png" Title="star"
Attributes="glassTypes.xml"></assembly>
    </heading>
    <heading title="Door Knob" width="220" height="220">
        <assembly Pic="/door/handle.png" Thumb="/doorThumbs/handle.png" Title="handle"
Attributes="None"></assembly>
        <assembly Pic="/door/roundKnob.png" Thumb="/doorThumbs/roundKnob.png" Title="Round Knob"
Attributes="None"></assembly>
        <assembly Pic="/door/eggtimerKnob.png" Thumb="/doorThumbs/premium.png" Title="Eggtimer
Knob" Attributes="None"></assembly>
    </heading>
</description>
```

Figure 2A

| Code | Heading | Assembly | Attribute | Title | Thumb | Pic | Attrib. Type | Thumb Height | ... | Other |
|---|---|---|---|---|---|---|---|---|---|---|
| 1 | 1 | | | Door Design | | | | | | |
| 1.1 | 1 | 1 | | Standard | standard.gif | standard.png | | | | |
| 1.2 | 1 | 2 | | Premium | premium.gif | premium.png | | | | |
| 2 | 2 | | | Upper Window | | | | | | |
| 2.1 | 2 | 1 | | Circle | Circle.gif | Circle.png | | 160 | | |
| 2.1.1.fabric | 2 | 1 | 1 | Clear | Clear.gif | Clear.png | fabric | 95 | | |
| 2.1.2.fabric | 2 | 1 | 2 | Frosted | Frosted.gif | Frosted.png | fabric | 95 | | |
| 2.1.3.fabric | 2 | 1 | 3 | Sunshine Pattern | Sunshine Pattern.gif | Sunshine Pattern.png | fabric | 95 | | |
| 2.2 | 2 | 2 | | Square | Square.gif | Square.png | | 160 | | |
| 2.2.1.fabric | 2 | 2 | 1 | Clear | Clear.gif | Clear.png | fabric | 95 | | |
| 2.2.2.fabric | 2 | 2 | 2 | Frosted | Frosted.gif | Frosted.png | fabric | 95 | | |
| 2.2.3.fabric | 2 | 2 | 3 | Sunshine Pattern | Sunshine Pattern.gif | Sunshine Pattern.png | fabric | 95 | | |
| 2.3 | 2 | 3 | | Diamond | Diamond.gif | Diamond.png | | 160 | | |
| 2.3.1.fabric | 2 | 3 | 1 | Clear | Clear.gif | Clear.png | fabric | 95 | | |
| 2.3.2.fabric | 2 | 3 | 2 | Frosted | Frosted.gif | Frosted.png | fabric | 95 | | |
| 2.3.3.fabric | 2 | 3 | 3 | Sunshine Pattern | Sunshine Pattern.gif | Sunshine Pattern.png | fabric | 95 | | |
| 2.4 | 2 | 4 | | Sun | Sun.gif | Sun.png | | 160 | | |
| 2.4.1.fabric | 2 | 4 | 1 | Clear | Clear.gif | Clear.png | fabric | 95 | | |
| 2.4.2.fabric | 2 | 4 | 2 | Frosted | Frosted.gif | Frosted.png | fabric | 95 | | |
| 2.4.3.fabric | 2 | 4 | 3 | Sunshine Pattern | Sunshine Pattern.gif | Sunshine Pattern.png | fabric | 95 | | |
| 2.5 | 2 | 5 | | Star | Star.gif | Star.png | | 160 | | |
| 2.5.1.fabric | 2 | 5 | 1 | Clear | Clear.gif | Clear.png | fabric | 95 | | |
| 2.5.2.fabric | 2 | 5 | 2 | Frosted | Frosted.gif | Frosted.png | fabric | 95 | | |
| 2.5.3.fabric | 2 | 5 | 3 | Sunshine Pattern | Sunshine Pattern.gif | Sunshine Pattern.png | fabric | 95 | | |
| 3 | 3 | | | Door Knob | | | | 160 | | |
| 3.1 | 3 | 1 | | Handle | Handle.gif | Handle.png | | | | |
| 3.2 | 3 | 2 | | Round | Round.gif | Round.png | | | | |
| 3.3 | 3 | 3 | | Egg Timer | Egg Timer.gif | Egg Timer.png | | | | |

Figure 2B

| | | | | | FileName: | Door Designer 1 | |
|---|---|---|---|---|---|---|---|
| | | | | | FileDirectories | | |
| | | | | | fabricsXmlLocation | http://www.dxxgma.com/DoorDesigner/ | |
| | | | | | xmlLocationPrefix | http://www.dxxgma.com/DoorDesigner/ | |
| | | | | | imageBaseUrl | http://www.dxxgma.com/DoorDesigner/ | |
| | | | | | fabricsImageBaseUrl | http://www.dxxgma.com/DoorDesigner/ | |
| | | | | | GeneralParameters | | |
| | | | | | basePrice: | | |
| | | | | | installHeading: | | |
| | | | | | Headings Tab Width | 170 | |
| | | | | | Fabrics Tab Height | 152 | |
| | | | | | Layout | Landscape | |

| | Source | | | Action | Rule | Target | | Attribute | |
|---|---|---|---|---|---|---|---|---|---|
| Rules | Heading | Assembly | Rule | | | Heading | Assembly | | |
| 2.1 Start Rule | 2 | 1 | | Disable | | 2 | 1 | 1 | Start Rule |
| 2.1 Start Rule | 2 | 1 | | Hide | | 2 | 1 | 2 | Start Rule |
| 2.1 Stop Rule | 2 | 1 | | Enable | | 2 | 1 | 1 | Stop Rule |
| 2.1 Stop Rule | 2 | 1 | | UnHide | | 2 | 1 | 2 | Stop Rule |

Figure 3

```
<attribute>
    <textures title="Glass Types">
        <type Texture="/door/clearGlass.png" Thumb="/doorThumbs/clearGlass.png"
        Title="Clear Glass" Blendmode="Multiple"></type>
        <type Texture="/door/frostedGlass.png" Thumb="/doorThumbs/clearGlass.png"
        Title="Frosted Glass" Blendmode="Multiple"></type>
        <type Texture="/door/sunshinePattern.png" Thumb="/doorThumbs/clearGlass.png"
        Title="Sunshine Pattern" Blendmode="Multiple"></type>
    </textures>
</attribute>
```

314

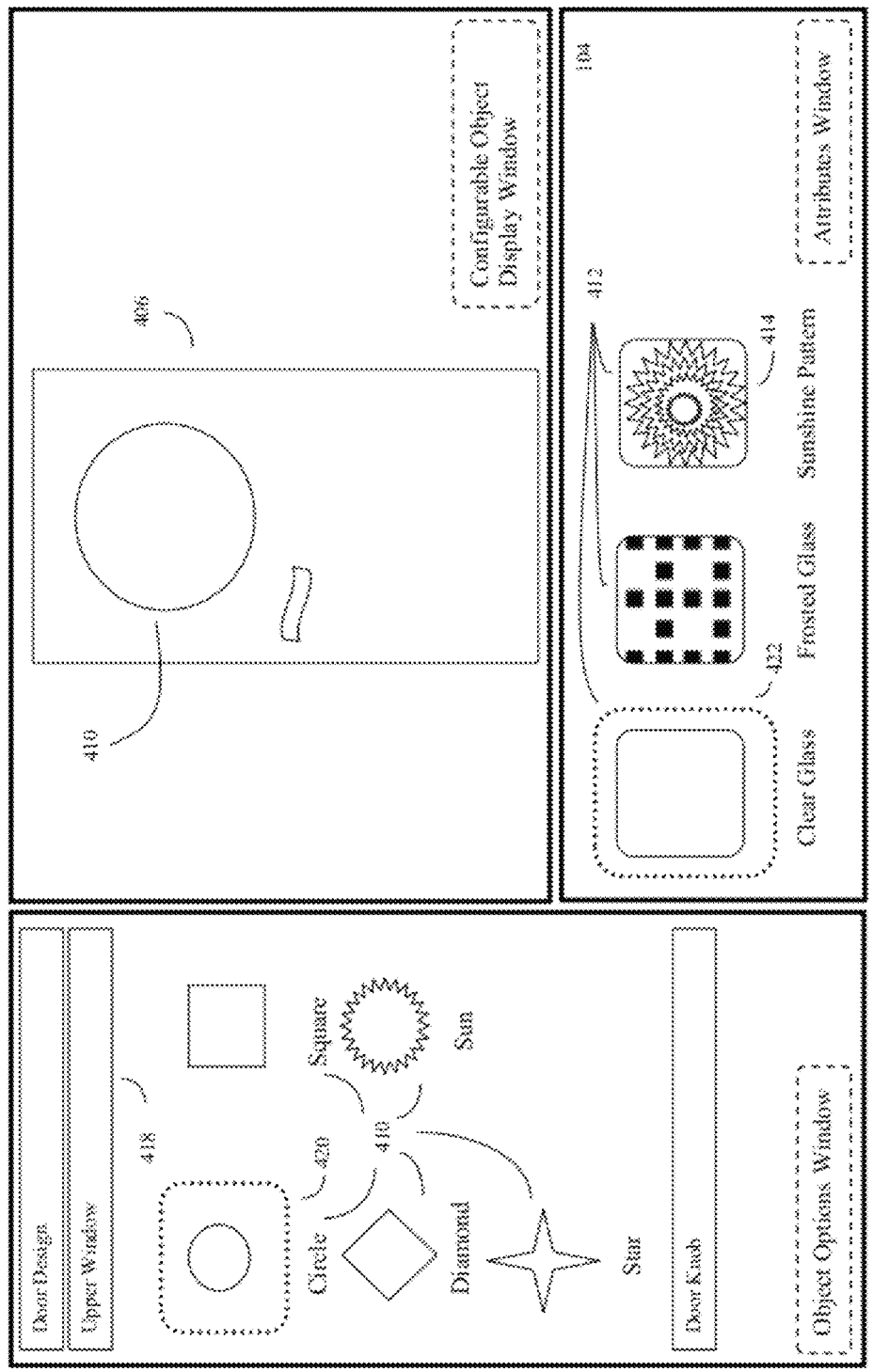

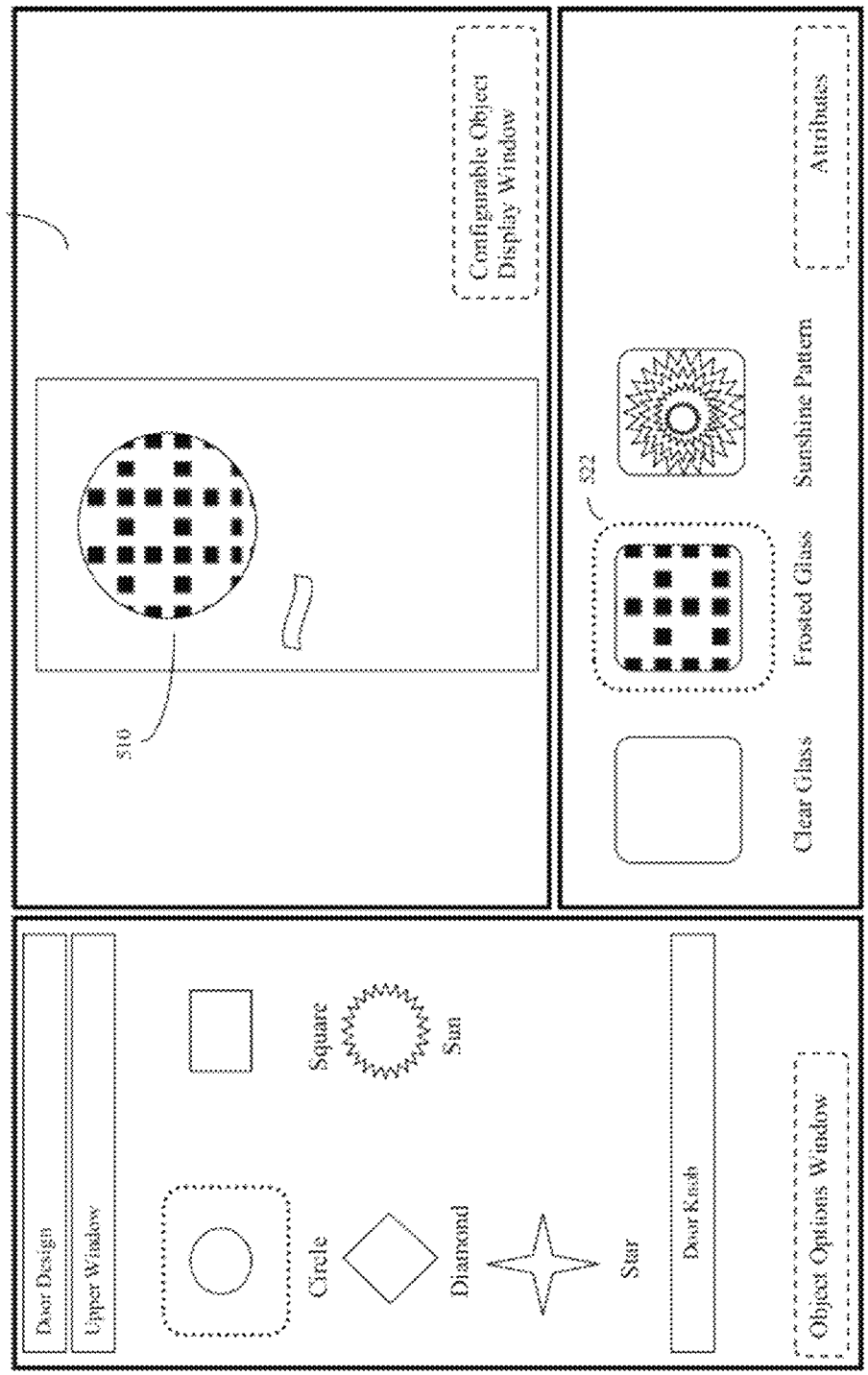

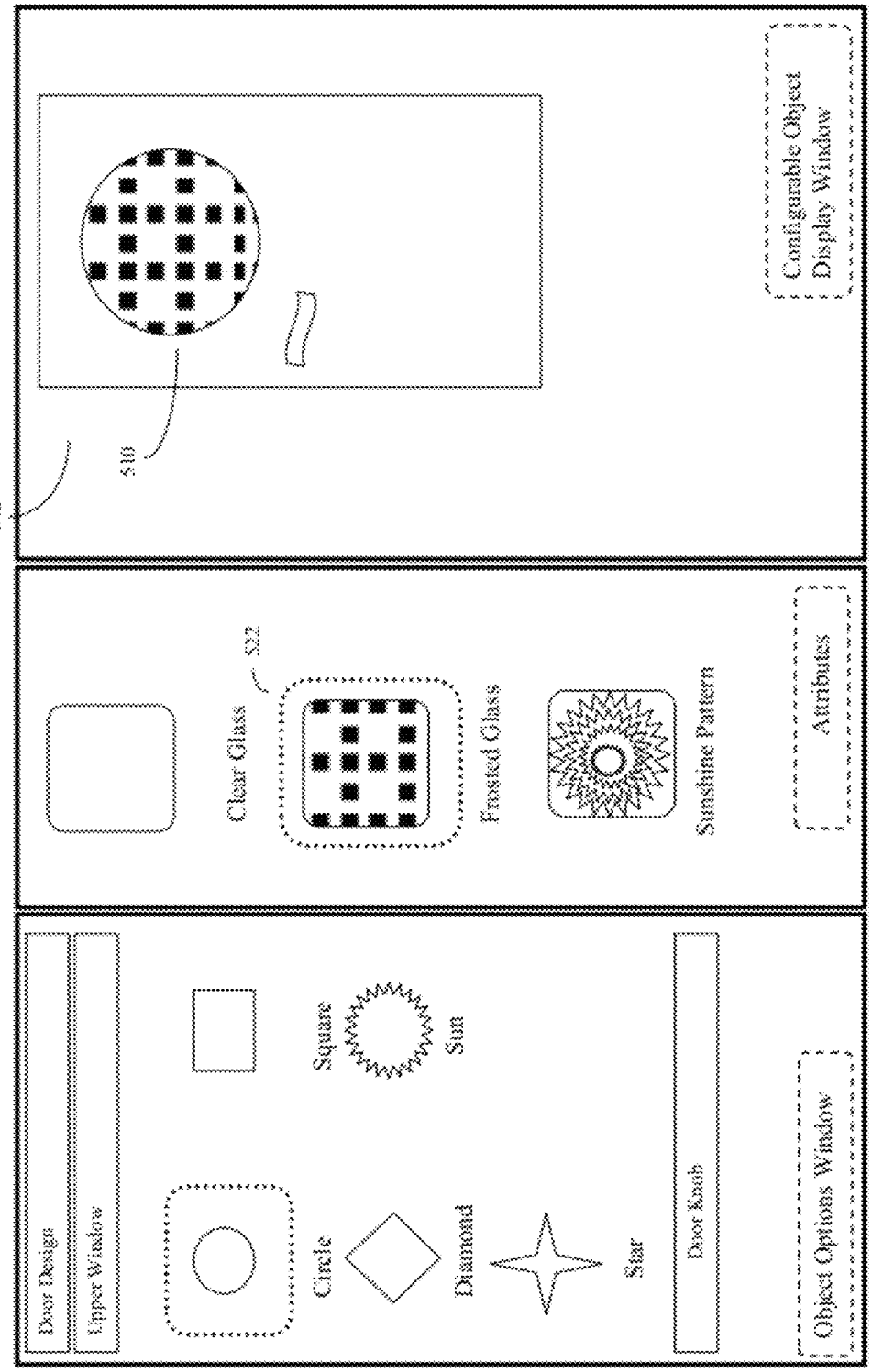

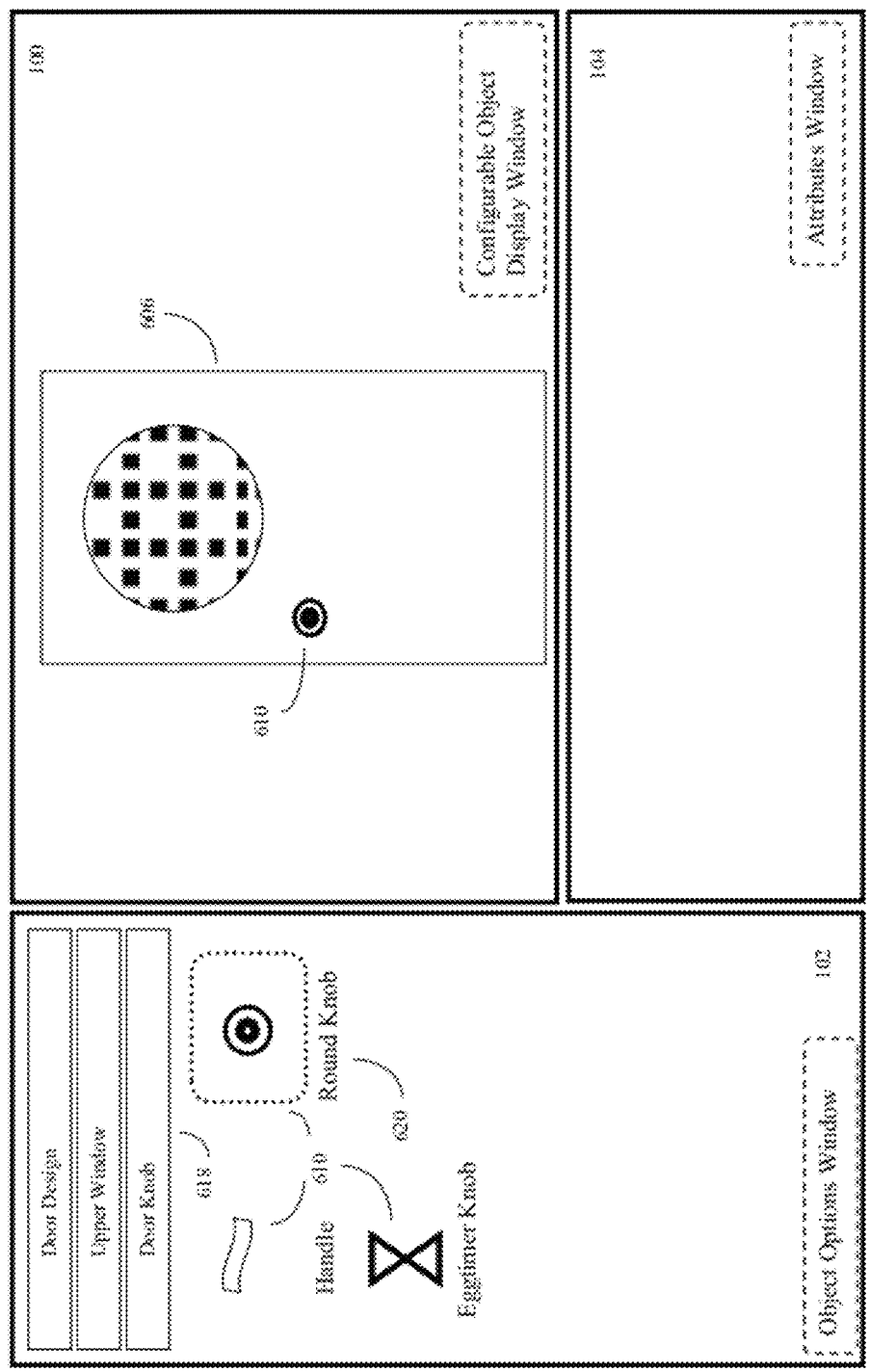

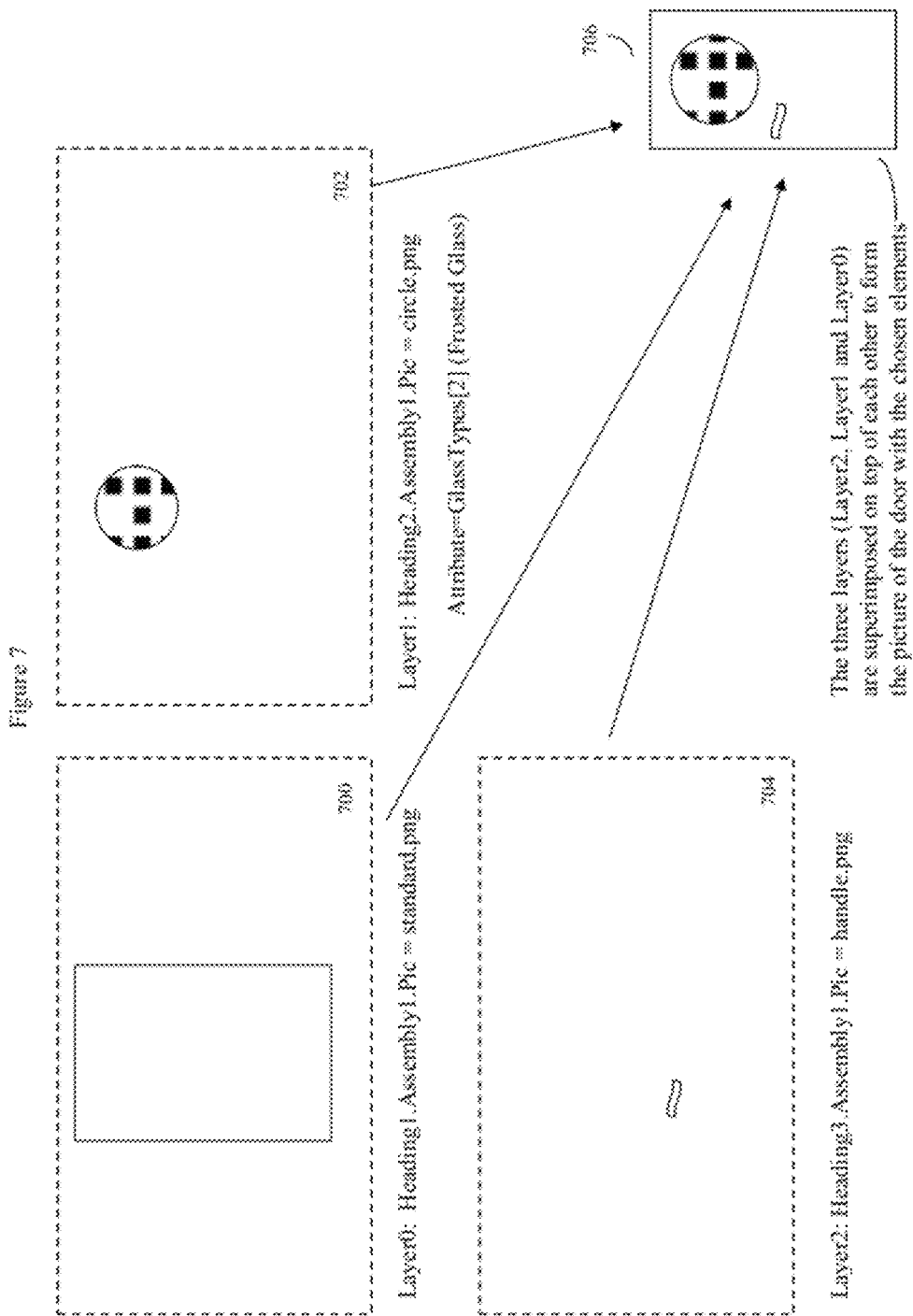

SYSTEM AND METHOD OF CREATING AND REMOTELY EDITING INTERACTIVE GENERIC CONFIGURATOR PROGRAMS

This application is a continuation in part of U.S. patent application Ser. No. 12/872,296, "INTERACTIVE GENERIC CONFIGURATOR PROGRAM", inventor Daniel Reuven Ostroff, filed Aug. 31, 2010; this application also claims the priority benefit of provisional patent application 61/511,985, "INTERACTIVE GENERIC CONFIGURATOR PROGRAM", inventor Daniel Reuven Ostroff, filed Jul. 26, 2011; this application also claims the priority benefit of provisional application 61/585,730, "SYSTEM AND METHOD OF REMOTELY EDITING INTERACTIVE GENERIC CONFIGURATOR PROGRAMS", inventor Daniel Reuven Ostroff, filed Jan. 12, 2012; this application also claims the priority benefit of provisional application, 61/674,831 "SYSTEM AND METHOD OF REMOTELY EDITING INTERACTIVE GENERIC CONFIGURATOR PROGRAMS", inventor Daniel Reuven Ostroff, filed Jul. 23, 2012; the disclosures of all of these applications are incorporated herein by reference.

BACKGROUND OF THE INVENTION

1. Field of the Invention

Systems and methods for ecommerce relating to customizable and personalizable products, and configurable bundles of products, in particular web based ecommerce systems.

2. Description of the Related Art

In the field of Internet ecommerce, it is desirable to enable users to easily define the desired configuration of one or more items or products that they wish to buy. For example, a user, upon viewing a product or products of interest on an Internet website, using his or her web browser, may wish to evaluate various versions of the product or products that may have various, colors, designs, peripherals or other options, see what the product would look like and cost given the various options chosen, and then make an informed buying decision based upon this evaluation. Software (often web server and web browser software) that enables such experimentation is often called a "product configurator" or simply "configurator" software.

A number of high-end manufacturers and retailers have implemented such product configurators on their websites. The Nike corporation, for example, operates a tennis shoe configurator that allows potential customers to create their own customized tennis shoes by selecting the material and colors of the Nike "swoosh" logo, the material (e.g. suede, coated leather, mesh, or leather with graphics) of the accent, underlay, tip/heel/tongue of the shoe, as well as the shoe's lace color, midsole color, and toe bumper color. The website allows the user to view the final product with these various color selections, and either share the results with other users, save the results, or purchase the tennis shoe.

Although such product configurators give customers an unprecedented amount of design freedom, and also represent great product sales tools, prior art product configurators, such as the Nike configurator, were generally purpose built—i.e. custom designed for a specific product and a specific company, and thus were extremely expensive to develop. Such prior art purpose-built configurators also lacked standardization, because each generally had their own unique graphic user interface (GUI) and modes of use. Thus product configurators were generally reserved for large organizations or at least well financed organizations.

Prior art configurators are described in U.S. Pat. Nos. 7,353,192, 7,584,155, 7,650,296; U.S. patent applications 20050102199, 20040113945, 20050027553, and 20030172003.

BRIEF SUMMARY OF THE INVENTION

In one embodiment, the invention may be an interactive generic configurator generator system and method. That is, the invention may be a software program, capable of running on standard computer processors such as the popular Intel/AMD x86 processors, or other processors, that enables designers and artists relatively unskilled in computer programming to input various graphics and various design rules intended to produce a configurator for a particular item, and the software and methods of the invention will then take these input graphics and design rules and output a configurator for the item of interest, here called an item or product configurator. This item or product configurator may then, for example, be uploaded to an Internet web server intended to provide information pertaining to the item or product of interest.

Customers and other persons interested in the item or product of interest may then, for example, access this website, run the Configurator using their particular web browsers, and experiment with various item or product configurations whenever they desire. The net effect of the invention is thus to both cost-reduce and deskill the process of producing product configurators, and make it more feasible for smaller, organizations and businesses to provide their customers with the benefits of item or product configurators. Furthermore, since the invention's "generic" configurator may have a layout and functionality that is consistent over many different items or products, end users may find it easier to operate.

At the highest level, the invention may be a method or system of creating or operating an item (e.g. one or more products) configurator intended to run under the control of at least one processor in at least one computerized device possessing a GUI. This, method or system may comprise creating a plurality of graphic layer files and graphic layer thumbnail files (these graphic layer thumbnail files will often be icons that represent or symbolize the content associated by the particular graphic layer file that the thumbnail file is associated with). The graphic layer files will usually represent or comprise comprising various layers of the item or product intended to be configured.

Often, at least some of this plurality of graphic layer files will contain some transparent pixels. This can be done to facilitate a simplified software "stacking" process in which various layers (graphic layer files) can be combined to create an overall image of a configuration of one or more particular items. Although the different graphic layer files need not all have the same dimensions (e.g. height, width) in terms of pixels, often the design of the configurator system and software can be simplified by adopting the convention that all of the different graphic layer files will have the same dimensions in terms of pixels. This way additional code that specifies the precise location of one or more certain item options need not be done, and instead this information is simply contained in the various graphic layer files themselves. Alternatively in more complex versions, the various graphic layer files can have different dimensions and suitable code can be provided to correctly align the various graphic layer files to create the image "stack" that represents a particular configuration of the item or items of interest.

The various graphic layer files and associated graphic layer thumbnail files (icons) can then be associated and their role in various item configurations defined by creating at least one main description file that describes the relationships between these files. The various graphic files and the main description file can then be read by an interactive generic configurator program (IGCP). This IGCP will read and parse these files, display icons on a Graphic User Interface (GUI) representative of various item configurator options, and can then be selected and used by the user as appropriate. The system will then generally save the user selected options upon exit from the IGCP for subsequent use.

The invention's software and methods enable designers who otherwise have little or no knowledge of programming to design and implement their own configurators. These designers may either manipulate the main description file using standard text editing programs, or alternatively manipulate the main description file using suitable wizard programs.

More specifically, the deskilled methods of the invention allow designers to design sophisticated configurators using simple and everyday graphics editing programs and data file manipulating programs. These graphics programs may be popular and generally universally used graphics programs such as Adobe Photoshop, the GIMP, and the like which are used to generate input graphic files. The relatively simple input data files, required by the invention (such as headings and product details) may either be entered directly into the invention's software, or alternatively and more commonly may be entered using common and everyday text or word processing editors such as Microsoft word, OpenOffice, and the like.

Thus, using the invention, smaller manufacturers and artisans who would like to offer their products online and enable users to customize the products and define the exact look, design, functionality and coloring of the product they wish to purchase; may easily generate configurators for their products at minimal cost.

In some embodiments, these methods may be used to configure a single item of interest according to various options. In other embodiments, these methods may be used to configure a group or bundle of related items (e.g. a group of clothing, furniture, china (tableware) and the like).

Additionally, in some embodiments, these methods may be used to collect information pertaining to the items of interest from multiple different websites, and in turn allow the users to create bundles of products for various ecommerce purposes.

BRIEF DESCRIPTION OF THE DRAWINGS

FIG. 1 shows the GUI of an interactive generic configurator program (IGCP) showing some of the key elements including a configurable object (item) display window, an object (item) options window, and an attributes window.

FIG. 2 shows an example of a main description file, here shown in XML format, that conveys information pertaining to the relationship between the various graphic layer files and thumbnail files (icons) used by the IGCP. Here this file is used to describe a configurable door.

FIG. 2A shows an alternate form of a main description file, which is organized in a row and column table structure, that conveys information pertaining to the relationship between the graphic layer files and thumbnail files (icons) used by the IGCP. This file also describes the same configurable door.

FIG. 2B shows additional information, which may optionally be included with the table structure form of the main description file, which includes additional information such as the static location of the image files on the server, the initial default heading that opens upon first running of the configurator, and various interaction rules.

FIG. 3 shows an example of an associated description file, here shown in XML format, that defines the attributes of at least one object (e.g. item, product) assembly. Here the attributes of the glass window for this configurable door are given.

FIG. 4 shows an example of the IGCP being used to configure various options for a door. Here the focus is on the shape of the glass to be used in the upper window of the door, and on the attributes (i.e. type) of glass that may be used to configure the door. Here the user has selected a round window in the object options window, clear glass in the attributes window, and this is shown on the door.

FIG. 5 shows how the appearance of the object (i.e. item, product) in the configurable object display window (here the door) changes when the user changes a particular attribute. Here the user has now decided to choose a frosted glass attribute in the attributes window, and this is now shown on the door.

FIG. 5A shows how in some embodiments, such as when an alternate form of a main description file that is organized in a row and column table structure is used, the IGCP can be programmed to make substantial changes to the layout of the configurator, for example from the landscape mode previously shown in FIG. 5 to an alternate portrait mode, in response to commands embedded in the main description file.

FIG. 6 shows how the appearance of the door object (i.e. item, product) in the configurable object display window changes when another option is chosen. Here the focus is on the type of doorknob used on the door. The user has chosen the round knob, and this is shown on the door. In this example, there are no additional attributes associated with the type of doorknob option, so the attributes window is blank.

FIG. 7 shows how the IGCP software essentially creates a software "virtual stack" or assembly of the different graphic file layers to create the final image of the object, item, or product in the configurable object display window. Here the different graphic layer files have the same size, and contain a large number of transparent pixels, allowing the different options to be easily assembled by software into the composite image of the configured door.

DETAILED DESCRIPTION OF THE INVENTION

Figure 8:
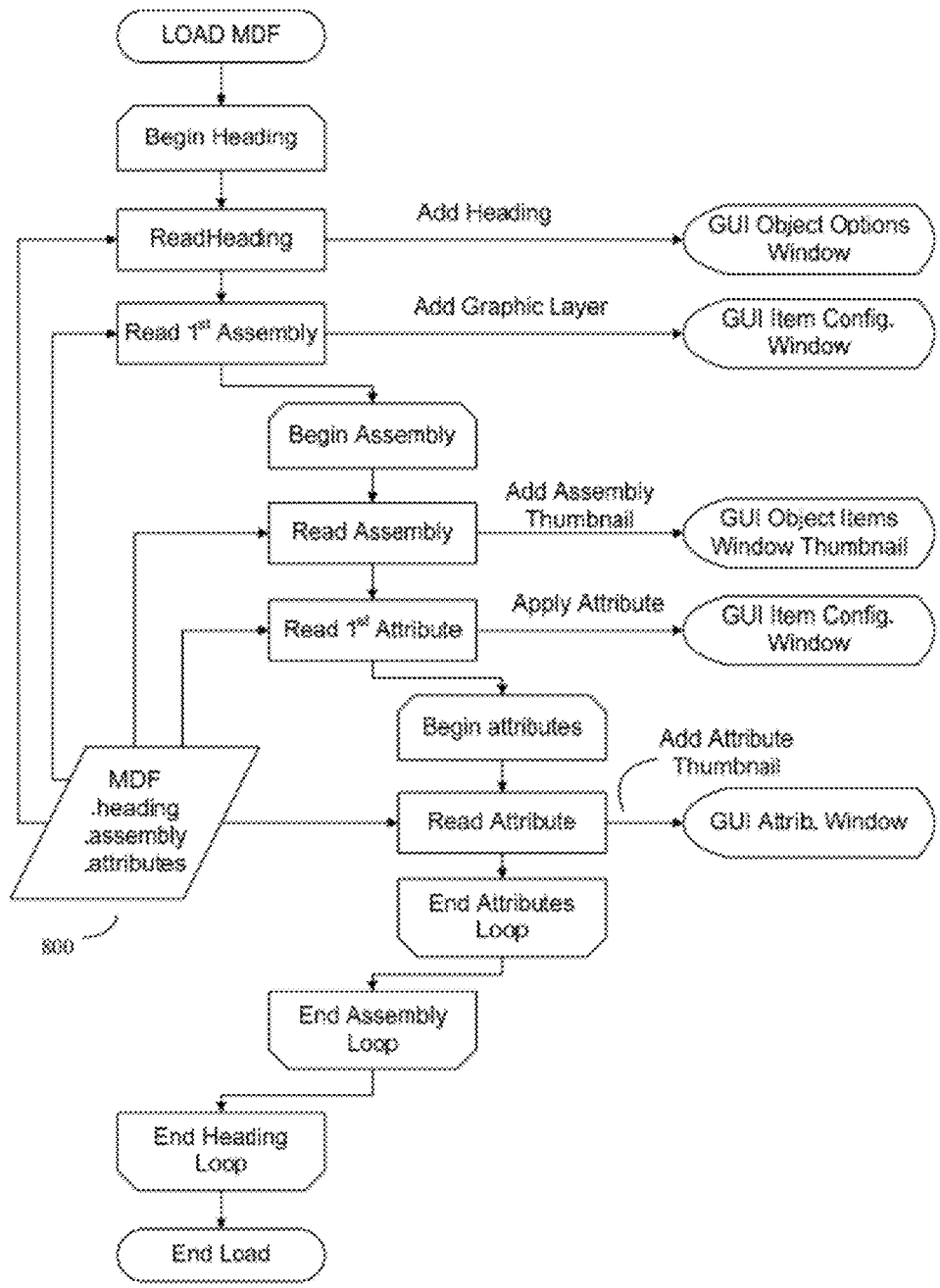
FIG. 8 shows a flow chart showing some of the key steps employed by the IGCP software as it loads the data from the main description file (MDF) and associated description file (that defines the attributes of various assembly definitions), as well as the various graphic files called by or associated with these files.

Nomenclature: The interactive generic configurator generator program will often be referred to in this specification in the alternative as an IGCP, a generic configurator generator program, a configurator generator program, or sometimes, depending upon context, as the configurator.

The generic configurator generator program enables users to configure one or more object or objects. The chosen configuration can then be communicated in order to define objects, select objects, or to order them for manufacture.

The main elements of this IGCP method, software, and system include one or more of the following:
a. graphic files
b. data files
c. The interactive generic configurator program running in display mode and interactive configurator mode.
d. An optional configurator editor and creation wizard or program.

The graphic files will typically contain several layers of graphics. When some of these layers are displayed and overlaid or superimposed on top of each other (by software) they form a picture, illustration or description of the object or objects that are to be configured. For some or all of the layers, alternative layers can be provided so that when displayed, they present a different version or configuration of the object or objects.

In order to show the configured object or objects from multiple angles, the pictures/illustrations used can depict multiple angles/views of the object such as rear, front, right and left views of the object. In some embodiments a rotatable 3D representation of the object such as a Flash .fla file can also be used. As needed, these pictures or illustrations may be obtained from various sources, including other internet web servers.

One or more data files, often called main description files or MDF, define information about the configurable object, the headings or menu for the configurator, the links to the graphic files, thumbnails and icons as well as details such as the available fabrics, colors and pricing of the alternative configurations. These main description files may be created using a variety of formats. One convenient format is the XML (extensible markup language) format, and many of the specific examples in this disclosure will be XML based main description files.

Another convenient format is a row and column based table structure format. Such formats can include the popular CSV (comma separated values) format, as well as other popular row and column formats, such as other popular spreadsheet formats (e.g. Excel spreadsheet formats, and the like). One advantage of the row and column format is that this allows configuration formats to be edited using familiar spreadsheet software, such as Microsoft Excel software, and the like, and this makes creating main description files easier, particularly for inexperienced users.

The easy-to-understand row and column based table structure is useful for presenting the main data file to the user who creates the Configurator for creating, editing and maintaining the Configurator. This table structure can also be stored either as a flat data file or the data can be stored in a database such as SQL.

Alternatively, the table format can be integrated into a common photo-editing software like Adobe Photoshop or The GIMP, so that the Configurator layout can be created and edited together with the graphic files enabling the creation of the Configurator within one creation environment. In such cases, the existing layer structure of the photo-editing software can be used and the additional information required for the Configurator can be specified as additional data applied to each Layer. According to the invention, a designer, who often will be an artist who may be reasonably adept at manipulating images using a graphics design program, but who otherwise need not know much about programming, may produce a IGCP based product configurator by the following steps:

In this example, assume that the designer wishes to produce a configurator for a simple chair or stool composed of a base to sit on, which may be available in various fabric patterns, various and various type of leg options.

EXAMPLE

1: The process will often start by the designer preparing an initial picture or drawing of the object or objects. This can be, for example, a photograph or illustration of the product, such as a photograph of the stool, or alternatively a photograph showing more than one products. Often this will be a series of photographs, such as a series of photographs of different chairs or stools with different seats, seat fabrics, and different types of stool bases (legs), preferably done under similar lighting conditions, camera angles, and magnifications.

2: The designer will often then use a conventional graphics program, such as Adobe Photoshop or other program, to separate various elements of the item where configuration or customization is desired and place these elements into separate graphic layers files. For example, assuming that a chair is being configured, the designer may separate the seat of the chair from the base of the chair. This will result in various graphic layers such Layer1:Seat0, Layer2:Base0, and so on.

3: The designer will then create alternative elements (i.e. the alternative configuration options) as additional layers. Thus for a chair, this can be variations of the chair base. This will result in various variation layers such as Layer3:Base1 (Three Straight Legs) and/or Layer4:Base2 (Triangular Base).

4. The designer will then save all layers as graphic files. This will result in the creation of various layers such as Seat0.gif, Seat1.gif, Seat2.png, Base0.gif, Base1.gif, Base2.gif, and so on.

5: The designer will then create graphic files for the thumbnails (icons) images used to symbolize the various configuration options and their configuration options. This will result in various files such as ThumbSeat0.gif, ThumbSeat1.gif, ThumbSeat2.png, ThumbBase0.gif, ThumbBase1.gif, ThumbBase2.gif, and so on.

6: The designer will then create the main description file (often in XML file format or in a row and column table structure format) for the configurator definitions. This will result in a file such as myChair.xml or myChair.csv.

7: The designer may then add additional optional information to the main description file. For example, the designer may add supported patterns for the chair seat1 option, which might for example be various fabric patterns or designs put into an attributes file as fun patterns.xml 8: In the event that some of the features of the designed item may not be compatible with other selected features, the designer may add rules to the main description file so that the Configurator will automatically add or enable or un-hide or remove or disable or hide features in order to ensure that the user shall only be able to select features that are compatible with each other.

9: A designer wishing to create a web enabled version of the configurator for ecommerce purposes, for example, may then store the various files on a suitable web server or other ecommerce server. Thus, for example, files such as myChair.xml, ThumbSeatO.gif, ThumbSeat1.gif, ThumbSeat2.png, ThumbBase0.gif, ThumbBase1.gif, ThumbBase2.gif, and so on will be stored in a form that can be accessed by a web browser that is retrieving data from a web page that runs this particular configurator.

10: Once the configurator and the various support files are loaded on a web server, then essentially any user in the world with access to the Internet and a web browser may then visit the appropriate web site, and run the IGCP or configurator program by, for example, clicking on icon on a webpage that shows the object to be configured.

11. This user can then choose the item or product to be configured. For example the user may click on an item labeled myChair, which in turn that loads the myChair.xml data and displays the configurator.

12. This user can then configure the product or products, and optionally click on an order button when the user wishes to purchase the product, click on a save button if the user wishes to resume configuration later, click on a share button to share the configuration with someone else, and so on.

Method for Saving and Sharing a Configuration of the Product:

In some embodiments, may be desirable to save the configuration. This option can, for example, enable a user to save the configuration so that it can be added to a shopping cart, or alternatively shared with other users (e.g. via email and social networks such as Facebook and Twitter). Someone (e.g. the original user or somebody who has received the configuration) can then go into the configurator, see the saved configuration and even continue making changes to it.

The product configuration can be stored, by, for example, creating a string or a database record that has a list of some or all the selected options. A database or data table can then be created with a unique identifier and the string or database record that contains some or all of these selected options. This unique identifier can now be added to a URL (for example: http://www.doogma.com#myconfiguration=1234) so that when any user clicks on the URL, the Configurator shall open with the saved configuration. In order to do this, the IGCP reads the URL, and if a suitable unique ID of a configuration exists, then the corresponding configuration record or string is retrieved from the database or data table and the IGCP loads with the saved configuration. Alternatively some or all of the selected options can be saved to a database entry record, and the string can simply be a unique identifier to this database entry record.

Thus, in one embodiment, the invention is a software system and method for creating an item configurator intended to run under the control of at least one processor in at least one computerized device possessing a GUI. This method will generally comprise creating a plurality of graphic layer files and graphic layer thumbnail files comprising various layers of the item desired for configuration. Generally at least some of this plurality of graphic layer files will contain some transparent pixels. The method also involves creating at least one main description file, which may be in XML format or table structure format, which describes the relationships between this plurality of graphic layer files. An interactive generic configurator program (IGCP) that is capable of reading and parsing this main description file, and displaying icons on the Graphical User Interface (GUI) that are representative of various user configurator selections will then be used to implement the configurator.

Thus the GUI of the configurator can be used interactively by the user to configure a product or products. Generally the user chooses an element of the object that the user wishes to configure and a number of thumbnails (icons) of various optional configurations of the chosen element are displayed under the specific heading. When the user clicks on a different thumbnail or icon, the corresponding graphics file layer is immediately replaced with an alternative graphics file layer that corresponds to the chosen thumbnail or icon. Similarly, when a user picks a specific value for an attribute such as pattern, this attribute (the pattern in this case) is applied to the selected element. The application of the attribute can be done by simply replacing the layer with a new layer in which the attribute is applied or by blending a graphic layer associated with the attribute with the non-transparent pixels of the layer using standard blending algorithms such as Multiply, Overlay, and Dissolve.

FIG. 1 shows the GUI of the an interactive generic configurator program (IGCP) showing some of the key elements including an configurable object (item) display window (100), an object (item) options window (102), and an attributes window (104). The image of the object (item, product) itself is built up by the software superposition of multiple graphic layer files (106), here shown as Graphic Layers 1.n. The heading section titles are shown as (108), and the assembly definitions corresponding to heading 2 are shown as (110), along with their associated thumbnail files or icons. The various attributes that may be associated with these assembly definitions are shown as (112).

Typically, the main description file will have a plurality of heading sections. Each heading section in turn will have a heading and at least one assembly definition. These assembly definitions essentially correspond to the various configuration options. Here each at least one assembly definition will have and be associated with at least one graphic layer file, usually at least one thumbnail graphic layer file (icon), as well as at least one assembly title descriptor. The assembly definitions will optionally also link to an associated description file that can be used to more precisely define the attributes of the at least one assembly definition.

Thus the main description file also defines each of the thumbnail graphics to be displayed for a specific heading, and how these are applied, as options for the Heading. Each object option (or thumbnail or icon) will often also have a title associated with it that is also defined by the main description file.

FIG. 2 shows an example of a main description file, here shown in XML format, that conveys information pertaining to the relationship between the various graphic layer files and thumbnail files (icons) used by the IGCP. Here this file is used to describe a configurable door. Here section (208) corresponds to a heading (previously shown as (108) in FIG. 1). Section (210) corresponds to the various assembly definitions (previously shown as (110) in FIG. 1). An example of a linked associated description file, (here another XML file) is shown in (212). This was shown visually in FIG. 1 as 112.

FIG. 2A shows an alternate form of a main description file, which is organized in a row and column table structure, that conveys information pertaining to the relationship between the graphic layer files and thumbnail files (icons) used by the IGCP. This file also describes the same configurable door. Here section (218) corresponds to a heading (previously shown as (108) in FIG. 1 and (208) in FIG. 2). Section (220) corresponds to the various assembly definitions (previously shown as (110) in FIGS. 1, and 210 in FIG. 2).

FIG. 2B shows additional information, which may optionally be included with the table structure form of the main description file, which includes additional information such as the static location of the image files on the server, the initial default heading that opens upon first running of the configurator, and various configurator startup rules.

The table structure format may conveniently selected from among standard spreadsheet (e.g. Excel, OpenOffice CALC, and the like) formats. Such formats include the popular Comma Separated Value (CSV) format, as well as other formats such as Excel formats (e.g. .XLSX, XLSM, .XLSB, .XLTX, .XLTM, .XLS, .XLT, .XML .XLAM, .XLA, .XLW), text formats (e.g. .PRN, .TXT, .CSV, .DIF, .SLK), and other formats (e.g. .DBF, .ODS, .WK1, .WK2, .WK3, .WK4, .WKS., DBF, .WQ1, .WB1, .WB3) and the like. These formats will be referred to collectively as common spreadsheet file formats. The format may be read by standard spreadsheets, customized programs, or alternatively by plugin programs for image manipulation software such as Adobe Photoshop, The GIMP, and the like.

A more detailed discussion of the row and column table structure format for the main description file may be found in Appendix 1 of this document, incorporated herein by reference.

In FIG. 2B, some example interaction rules are shown. In this case, the rules are used to cause the Configurator to make certain choices available or unavailable depending on the selections made by the user. Start Rules are triggered when the Source choices are selected and these rules are applied to the specified Target Layers. The StopRules are later triggered when the user un-selects a choice.

FIG. 3 shows an example of an associated description file, here shown in XML format, that defines the attributes of at least one object (e.g. item, product) assembly. This corresponds to the glassTypes.xml file previously called or linked to by (212) in FIG. 2. Here the attributes of the glass window for this configurable door are given. The various .png files (312) call thumbnail sized graphics (icons) which correspond to the icons of the attributes (112) in FIG. 1, as well as the specific glass attributes (412) shown in FIG. 4. Thus for example, the icon of Sunshine Pattern glass (414) shown in FIG. 4 is linked by the reference to sunshinePattern.png in FIG. 3 (314).

Thus for example, consider a configurator for a door in FIG. 4 (406), which may have a front window inside it made of glass (410). The shape of the glass can be defined by the various assembly definition sections of the main description files. The attributes of this glass (for example is the glass clear or frosted or sunshine pattern), can in turn be defined by various associated description files associated with the front window assembly definitions.

Typically, the application of an attribute such as a color or pattern is carried out by applying commonly used blending algorithms, similar to those used in software like Flex or Photoshop, again using blendmodes such as overlay, multiply, or dissolve.

FIG. 4 shows an example of the IGCP being used to configure various options for this type of door. Here the focus is on the shape of the glass to be used in the upper window of the door, and on the attributes (i.e. type) of glass that may be used to configure the door. Here the user has selected a round window in the object options window (420), and clear glass in the attributes window (422), and these selections have been taken by the IGCP and have been incorporated onto the graphic of the door (406) (410).

FIG. 5 shows how the appearance of the object (i.e. item, product) in the configurable object display window (here the door) changes when the user changes a particular attribute. Here the user has now decided to choose a frosted glass attribute in the attributes window (522), and this is now shown on the door (510).

When the IGCP is used to read a table structure type main description file, the IGCP can also be programmed to recognize that changes in the layout of the table structure can result in major changes in the behavior of the configurator. An example of this major change in the behavior of the configurator is shown in FIG. 5A.

FIG. 5A shows how in some embodiments, such as when an alternate form of a main description file that is organized in a row and column table structure is used, the IGCP can be programmed to make substantial changes to the layout of the configurator, for example from the landscape mode previously shown in FIG. 5 (540) to an alternate portrait mode (542), in response to commands embedded in the main description file.

In FIG. 6, the user has either clicked on the heading "Door Knob" (618) in the object options window (102), or alternatively clicked on the Door Knob itself (610) in the configurable object display window (100). Either operation may cause the icons of the various options of the door knobs (610) to be displayed in the object options window (102). Also shown in FIG. 6 is how the appearance of the object (i.e. item, product) (606) in the configurable object display window (100) changes when another option is chosen. Here the focus is on the type of doorknob used on the door (620). The user has chosen the round knob, and this is shown on the door (610). In this example, there are no additional attributes associated with the type of doorknob option, so the attributes window (104) is blank.

FIG. 7 shows how the IGCP software essentially creates a "virtual stack" or assembly of the different graphic file layers (700), (702), (704) to create the final image (706) of the object, item, or product in the configurable object display window. Here the different graphic layer files have the same size, and contain a large number of transparent pixels, allowing the different options to be easily assembled by software into the composite image of the configured door (706).

The IGCP can be implemented using various programming languages and techniques. In one convenient method, the IGCP may implement a program loop wherein for each heading section in the at least one main description file, the IGCP will first read the heading describing a particular class of configuration options (e.g. various types of door knobs for a door), and display this heading onto the configurator GUI. The IGCP may then read the first assembly definition (the default assembly) of each heading and display the graphic layer file associated with this assembly definition into the configurator GUI configurable object display window as well. For example, the IGCP might select the first specific door knob assembly definition under the general doorknob class of configuration options and show this as the first default version of the item, object, or product that is shown to the user before the user makes any selections of substitutions. Often this first assembly definition will be a version that the manufacturer might like to suggest, such as the most popular version, or possibly the most profitable version of this assembly. For example, for doorknobs, a round doorknob might be selected as the first assembly definition.

FIG. 8 shows a flow chart showing some of the key steps employed by the IGCP software as it loads the data from the main description file (MDF) and associated description file (that defines the attributes of various assembly definitions), as well as the various graphic files called by or associated with these files. Here the main description file MDF (800) may be, for example, the file previously shown in FIG. 2, and the attributes file may be, for example, implemented by the file previously shown in FIG. 3. The IGCP program may, for example, load the data and figures employing a series of nested software loops, and may make optional use of a convention that the first assembly falling under a particular heading is the default assembly, or use other convention as appropriate.

Other information may also be included with the assembly definitions. This other information may include, for example, one or more codes representing a price category that can be used to calculate and display the impact of choosing said assembly definition on the price of said item. For example, if a fancy doorknob shaped like an egg timer is more expensive than a standard round doorknob, the assembly definition file might include this price information, display the price along with the various assembly object options, and/or also use this price information to calculate the final price of the item, object or product being configured.

Sometimes the choice of one type of assembly option may exclude the choice of a different type of assembly option. For example, the two choices may be incompatible with each other. To cope with this issue, in some alternative embodiments of the invention, at least some of the assembly definitions may contain one or more interdependency codes that either disable use of other assembly definitions if that assembly definition is chosen by said user, or disable use of a particular assembly definition if the use of another assembly was chosen by the user.

In any event, the IGCP will then read the other assembly definitions under their general headings, and if a particular assembly definition contains a link to an associated description file, then said generic configurator program may apply the attributes associated with this associated description file to the at least one graphic layer file associated with this assembly, and also display these attributes in a GUI attribute display window as additional attributes that may be applied should the user click on one of these attributes in the GUI attribute display window.

Thus, again using the door configurator from FIG. 4 as an example, suppose that under the upper window heading (418) (see FIG. 2-208 for the corresponding code or data) used to show a variety of different upper glass windows for the door (410), the various glass shapes defined under the various assembly definitions (see FIG. 2-210 for the code or data) contain one or more links (see FIG. 2-212 for an example) to a glass types attributes file (shown in FIG. 3). The IGCP will read this glass types attribute file, and both show the option on the door, and show one or more icons for this option (412) in the attributes window (104) of the GUI.

A number of different types of attributes are possible. These include, but are not limited to colors, patterns, textures, fabrics, materials, and available sizes.

Thus for each assembly definition, the IGCP will generally display the associated thumbnail graphic layer file as an icon associated with the display of this heading onto the IGCP GUI, and also display at least one assembly title descriptor associated with this display of this heading on the IGCP GUI.

Thus if a user of the configurator selects an icon on the GUI, (e.g. FIG. 4-410) the IGCP will replace the associated graphic layer files in the IGCP item configuration window with a new graphic layer file associated with the selected icon, as well as apply the defined attributes specified by the linked associated description file associated with the selected icon onto the assembly. Further, when the user indicates on the GUI interface that he or she is finished, the IGCP will usually save a record of the icons or more precisely the options represented by the icons that have been selected by the user.

Figure 9:
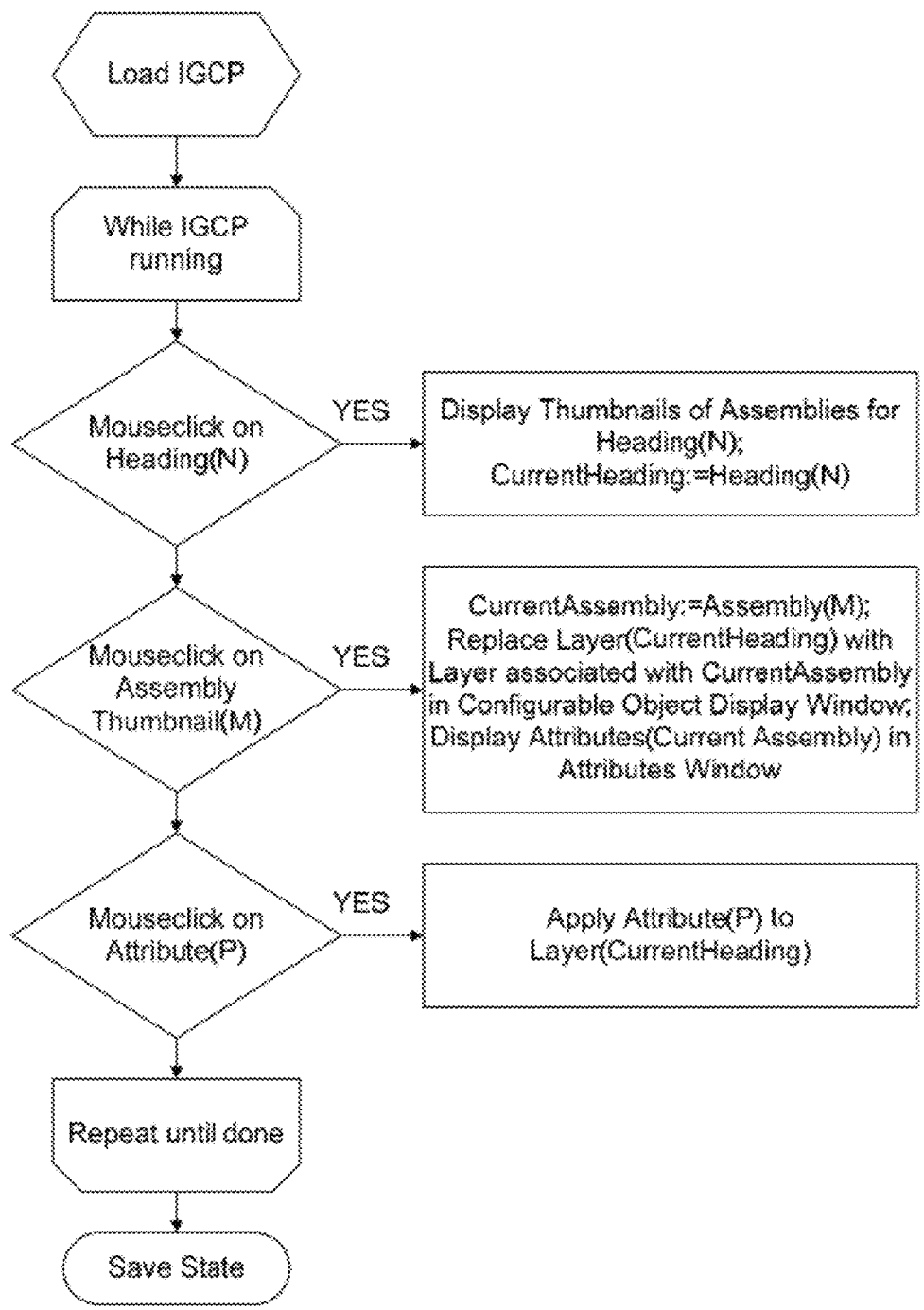
FIG. 9 shows a flow chart showing some of the key steps employed by the IGCP software as it runs in configurator mode. As the user clicks on various options (heading, assembly, attributes), the IGCP selects the appropriate graphics files associated with the particular selection and constructs a new composite image of the configured object, item or product, and displays it in the IGCP configurable object display window. When the user is finished, the IGCP will normally save the state of the object, item, or product (i.e. what options the user ended up selecting) for later use.

FIG. 9 shows a flow chart showing some of the key steps employed by the IGCP software as it runs in configurator mode. As the user clicks on various options (heading, assembly, attributes), the IGCP selects the appropriate graphics files associated with the particular selection and constructs a new composite image of the configured object, item or product, and displays it in the IGCP configurable object display window (100). When the user is finished, the IGCP will normally save the state of the object, item, or product (i.e. what options the user ended up selecting) for later use.

Figure 10:
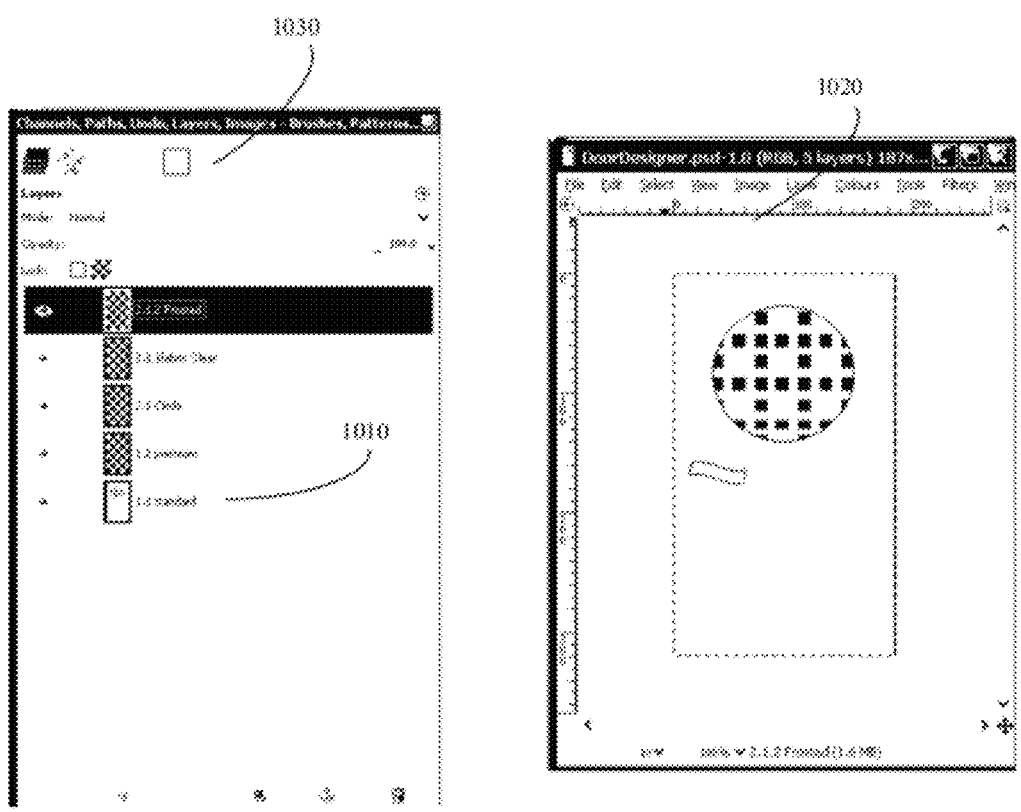
FIG. 10 shows an example of how the numbering system used in the data file structure, and the IGCP, can also be used within other software, such as a photo editing tool (in this example, an open source photo editing tool called the GIMP). Here the IGCP is configured as a plugin.

FIG. 10 shows an example of how the numbering system used in the data file structure can also be used within the photo editing tool (in this case GIMP). As each layer such as 1010 can be numbered according to the naming conventions specified in the user guide (Appendix A), much of the information required to create a main description file can in fact be integrated into the photo-editing tool. This can be achieved by creating a purpose built photo-editing software application or as a plug-in that can be added to an existing photo-editing tool (the "Configurator Plugin"). The Configurator Plugin can implement all the same logic as the IGCP and effectively create a Configurator Design Tool where the user can create all necessary layers and the Configurator Plugin can export the required main description files and graphic files seamlessly to be used by the IGCP.

In FIG. 10, 1020 shows the main window where the graphic layers are shown and can be edited. 1030 is a list of the layers using the numbering system of the data file structure and the additional information for each layer (equivalent to a row in the data structure) can be displayed or edited when the user clicks or right-clicks on the layer in 1030.

As can be seen by the examples on FIGS. 2, and 3, the actual main description files and associated description files used by the IGCP need not be very complex, and indeed may be standard XML files that can be edited by nearly any text editor. However in some situations, the designers or configurator artists may want a still simpler method to produce the main and associated description files. Here in order to simplify the process even further, one or more types of automated wizard programs may be constructed to automatically produce the description files by, for example, a designer's selection of configurator options and modes of operation on the graphical user interface of an auxiliary or built-in wizard program.

As previously discussed, in some embodiments, it will be useful to simplify construction of the IGCP and the configurator system by imposing the restriction that all graphic layer files must have the same width and height dimensions in terms of pixels. This way all of the graphic layer files may be superimposed on each other to produce a composite image without the need to specify the relative location of any particular graphic layer file relative to another particular graphic layer file. In this scenario, often most or all of the plurality of graphic layer files will contain at least some transparent pixels, with the possible exception of those graphic layer files that may be intended to represent the background area of the GUI displayed image.

The invention is particularly useful for Internet based server-web browser based ecommerce methods. Although the IGCP program may be run on a web server, often it will be more convenient and give the user faster operation if the IGCP is instead run on the user's local computerized device, such as inside the user's local web browser.

Here although the IGCP may originally reside on the web server, it may be uploaded to the user's web browser when the user clicks on, for example, a particular web page. The IGCP can in turn access and upload various graphic layer files and graphic thumbnail files (icons), main description files, and association description files from the web server as needed.

For these and other applications, often it will be useful to include additional program code to enable the user to optionally save the current state of the configurator. This will enable the user to stop work, and continue working at a later time. Here the configuration may be saved by, for example, one or more data files describing which elements the user chose and any additional information about changes that the user made to the configurator displayed item. These may be stored on the user's local computerized device, for example in the form of small "cookie" files commonly used by web browsers, or alternatively saved on the web server or in a database available to the web server.

Alternative embodiments of the invention include embodiments that enable the user to order the item or add the item to a shopping cart. Here for example, the steps of ordering the item or adding the item to a shopping cart can be done by saving the data describing which elements the user chose, and any additional information about changes the user made to the configurator displayed item, usually by creating one or more data files or writing to one or more data files, for example to files in a database such as a MySQL database. This data can then be used by a recipient of the order to determine the exact required configuration of the ordered Item the user wants. When these options are done, often it may be desirable to also generate a graphic file of the final configuration of the item and attaching this graphic file to the order or to the shopping cart webpage/form in order to prevent confusion and assure the user that the correct configuration has been selected and ordered.

In addition to being used to configure items or products made by single manufacturer, the methods of the present invention may also be useful for coordinating communication between the manufacturer and third party suppliers for certain custom parts as well. For example, consider the door configurator previously discussed. A third party manufacturer of custom door knobs may wish to provide photos of their particular product to the door manufacturer, and the door manufacturer may desire this since in general, the more custom options are available to customers, the higher the demand will be for the door. These photos may be converted to suitable configurator graphic layer files.

Here the invention may be used to more easily enable the third party door knob manufacturer to sell their custom door knobs, and also inform the third party door knob manufacturer when a user has selected their product so that they can send their custom door knobs to the door manufacturer.

In this situation, for example, at least some assembly description files and graphic layer files, corresponding to third party item options, may be supplied by one or more third party suppliers. These third party item options can then be automatically included in an ecommerce shopping cart or order form, so that if a user selects one or more of these third party item options, an automatic notification can be sent to the relevant third party supplier to provide their particular item or product (i.e. the doorknob) to the main manufacturer or assembler of the configured item (i.e. the door) prior to shipment of the finished item (the door).

The IGCP can be implemented using a variety of different programming languages and be run on a variety of different platforms. Some embodiments of the IGCP may be implemented in the form of one or more SWF Adobe Flash Files that can be run on any web browser that has the Adobe Flash Plug-in installed. To do this, the IGCP can first be written using a SWF File creation program such as Adobe Flex. In this embodiment, the SWF file may be loaded in real time by the web browser, and the main description file data (often in XML format) and the various graphic files (often in the form of .gif, or .png file format) may be read from their storage locations on a web server. Alternatively, the IGCP may be implemented in other languages such as HTML5. These alternative languages may be particularly useful for those web browsers that do not run Adobe Flash.

Note that although web server-web browser examples have been used throughout this specification as one way in which the invention's configurator and IGCP can be implemented, these examples are not intended to be limiting. In other embodiments, the configurator and IGCP may be implemented on a single computerized device, which need not necessarily be connected to the internet. A good example of such an alternative embodiment would be an in-store multimedia kiosk. Here customers could use the kiosk to configure various products on the spot, and the store itself may then supply the configured product directly.

The combination of the graphic files and the data files provides effective means for defining an instance of the configurator that can define one or more configurable objects. This definition of the instance of the configurator can be very useful for individuals with or without programming skills to define and communicate regarding the definition of a particular configurator.

In some embodiments, the XML data can also include the price of each element (e.g. assembly price) so that the total price of the product can be calculated and displayed at any time for the exact configuration of the product as chosen by the user. The total price can be calculated as a function of the sum of the prices of the each of the selected assemblies (to which additional amounts can be added or subtracted for shipping, discounts, etc.).

Other Options and Features:

In some embodiments, the invention may allow a designer or users to drag and drop a graphic icon displayed under the headings or in the attributes display window, and place it on a predetermined spot in the item configuration window. Other icon manipulation items that may be provided include options to resize, rotate, or move the icon, as well as options to change the icon color, transparency and/or blendmode. As previously discussed, the application of an attribute such as a color or pattern may be carried out by applying commonly used blending algorithms, similar to those used in software like Flex or Photoshop, using blendmodes such as Overlay or Multiply or Dissolve.

In another optional feature or mode of operation, if a text icon is chosen, the user may be given the ability to add text to a desired area and graphic layer. The user may also be given the option to modify this text accordingly. For example, the user may be given the option to choose the text font and color; resize, rotate, or move the text, as well as to adjust the text transparency and blend mode.

In another optional feature or mode of operation, all steps carried out by the user while configuring the object may be logged (possibly in conjunction with an optional time stamp or by sending events to an online analytics tool such as Google Analytics). This information can later be used to analyze which configurations of an item or product users prefer. The data can also be used to analyze the use of the Configurator, in order to learn how to improve it.

Such easy-to-create configurators can be used by smaller manufacturers and artisans who would like to offer their products online and enable users to customize the products and define the exact look, design, functionality and coloring of the product they wish to purchase. Such easy-to-create configuarators can also be used by internet retailers wishing to offer a variety of customizable products while providing a consistent GUI, enabling users to customize various products without the need to re-familiarize themselves on how to operate the configurator in each case.

Remotely Hosted and Edited Embodiments

In alternative embodiments, the configurator engine, associated files and remote configuration editing software can be hosted on a configurator server. The configurator editing software described herein enables a user to create and edit a configurator without having to edit the configurator data tables and data fields directly. Instead, the configurator editing software allows the user to edit configurator data fields within the same user interface as the configurator itself.

In the examples herein, although the discussion primarily focuses on how the configurator data table and data field editing process can be done remotely, in some embodiments both the configurator data table/data field editing and the configurator software may be hosted locally as well.

Figure 11:
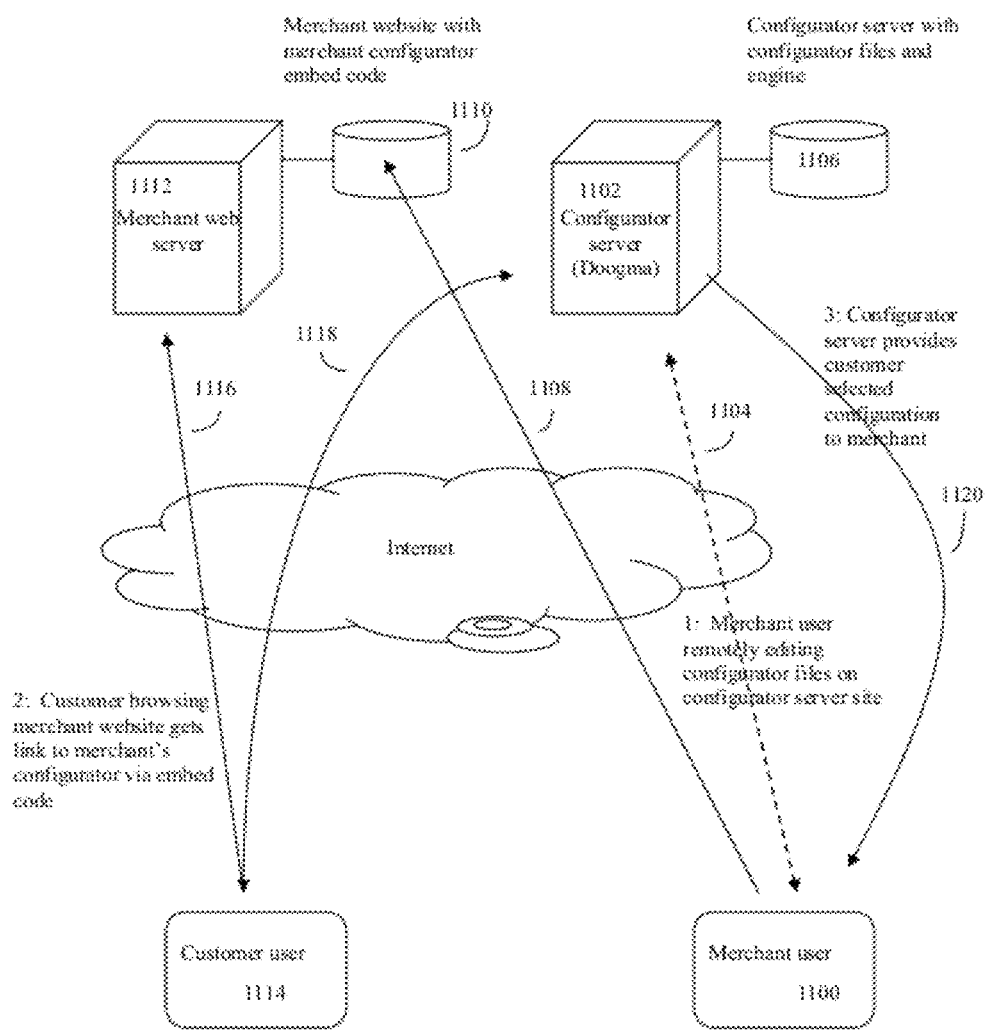
FIG. 11 shows an overview of a system and method for remotely editing configurator files, and also hosting said configurator files on a configurator server.

Occasionally in this discussion, the configurator server presently hosted by the Doogma Company will be used as a specific example. Thus the configurator server will occasionally be referred to in the alternative as the Doogma server. This example is shown in FIG. 11.

In this embodiment, the commercial user who originally wishes to provide and then maintain a configurator for a particular item of interest, which will often be an item or goods for sale, will be referred to as the "merchant user". The merchant user either directly, or through an employee or contractor, is assumed to wish to provide one or more configurators for various items for sale in order to facilitate sales.

To simplify configurator production and subsequent maintenance, often the merchant may not wish to have to worry about maintaining the proper configurator editing software, but may rather prefer to remotely edit the configurator for his or her merchandise by a remote solution, such as by using the merchant's web browser running on the merchant's computer (1100) to access configurator editing software that is hosted on the configurator server or other remote internet site (1102). The configurator server can then take merchant user commands (1104), and in turn modify configurator files (such as the previously discussed .CSV files or other configurator database format files) which are often stored on the configurator server's database or other mass storage device (1106).

Once the merchant user has edited the configurator to the desired state, the configurator server can then provide a URL link or other embed code to the merchant user (not shown). The merchant user can then in turn transmit this embed code (1108) and embed it the merchant's website database (1110) which often will be hosted by another merchant server (1112).

A customer user, who is using his or her own web browser (1114) to browse the merchant web server (1112) and merchant website, when desiring to customize an item of interest, can download and open up the merchant web page with the appropriate configurator embed code (1116). The configurator embed code will then direct the customer's web browser (1118) to the configurator server (1102) for configuration purposes. The customer can use the configurator but cannot otherwise modify the underlying configurator files or settings.

Once the customer finds the desired configuration, the configurator server (1102) can then transmit this customer selection (1120) back to the merchant user (1100).

Using this method, the end customer has the opportunity to buy the product, pay by a payment service such as credit card or PayPal, and the cash goes into the website (1112) controlled by the merchant website user (1100).

As will be discussed, the advantages of this approach is that a merchant user can remotely edit the configurator without having to worry at all about the details of the underlying configurator CSV files or other database format files. Instead, the configurator server can manage the process by providing an easy to use, often web browser based, graphical interface that allows the merchant user to easily edit his or her configurator using only a standard web browser.

It should be understood that the underlying configurator CSV files or other database methods, and the other configurator methods previously discussed still apply, and still are being run in a similar manner on the configurator server (1102). However these methods greatly streamline the configurator editor user interface.

For example, consider a guitar merchant (1100) who has a guitar sales website (1112), and wishes to provide a custom guitar configurator so that customer visitors (1114) to his guitar sales website can configure custom guitars.

The invention additionally provides an easy to use remote interface, such as a web browser oriented interface, allowing the guitar website owner to remotely manipulate (edit) various guitar configurator files using the guitar merchant user's web browser. In general, all of the various configurator database fields (e.g. the previously described CSV fields or database fields) may be supported using these methods.

The remote configurator editor may be accessed by the remote merchant user (1100) using various methods. In one convenient option, a similar configurator user interface can be provided by the configuration server (1102) to both the customer user (1114) using the configurator to design and purchase a product, as well as the merchant user (1100) who is editing the basic functionality of the configurator itself.

In one convenient method, the merchant may access the configurator server hosted configurator and remote editor (1102) via a standard web browser interface, but access the configurator editor, which will otherwise be hidden from consumer users (1114), by entering a secret key code that instructs the configurator server (1102) that the user wishes access to the remote configurator editor. The system (1102) may in turn request a password, which if valid then allows the merchant user (1100) to get access to remote edit mode. Other security mechanisms may also be used.

Figure 12:
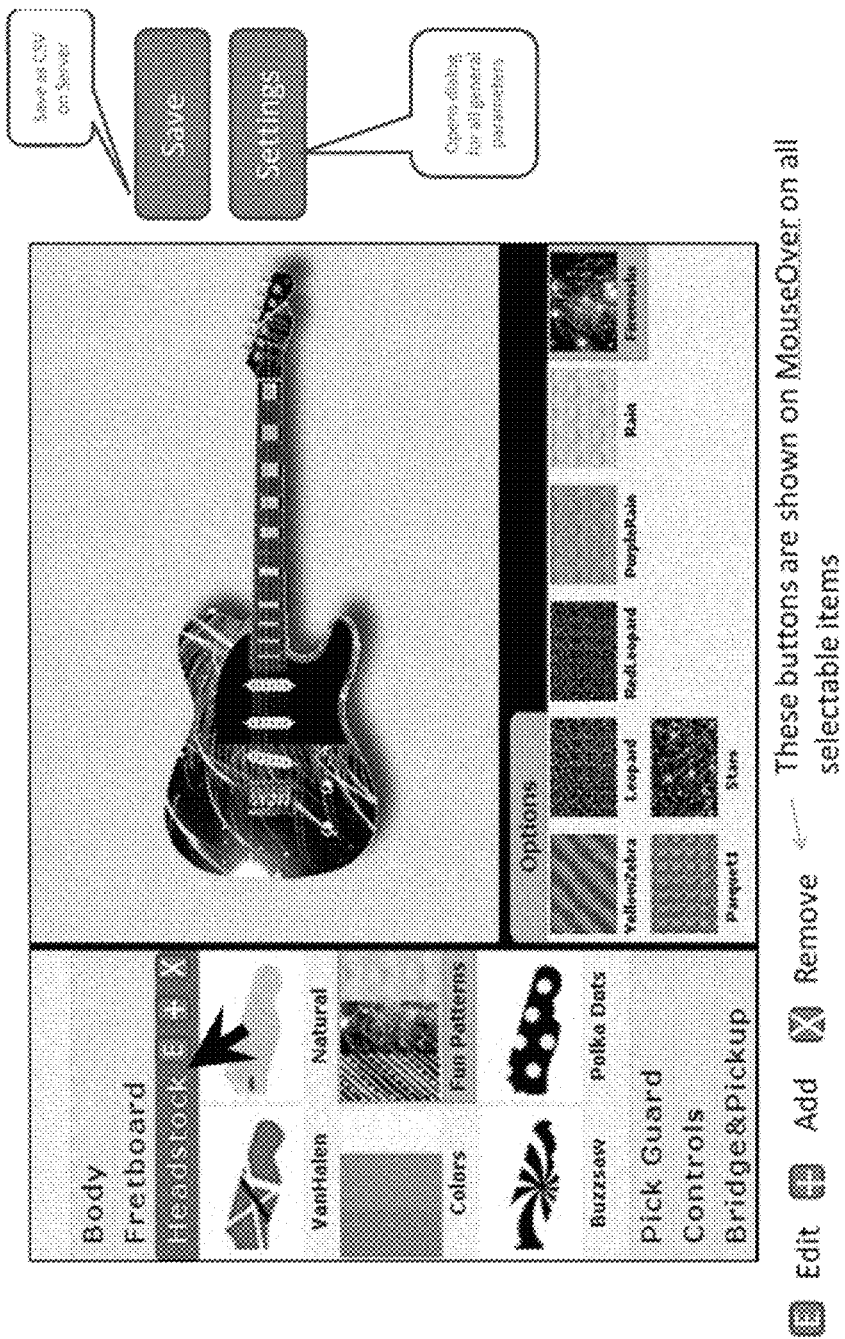
FIG. 12 shows a user interface for a WYSIWIG remote configurator file editor for a guitar configurator that is running in a configurator web server, but being edited in a web browser of a merchant or other editor user computer.

FIG. 12 shows how the remotely served configurator editor may look while running in the merchant user's web browser (1100). In a preferred embodiment, the remotely edited configurator user interface provides a convenient remote interface to allow the user to quickly make changes to the configurator in a graphical (what you see is what you get) user interface.

This remote configurator editor interface gives the merchant user (1100) the ability to save the remotely edited configurator files in the configurator server database (1106) or other mass storage device. As before, the configurator files themselves can continue to be in the previously discussed CSV data format (or other database format).

In this example, when the merchant user clicks on the "settings" button, his web browser then opens a dialog box to allow editing of the merchant user's general configurator parameters.

When the merchant user clicks the "save" button, the edited configurator files do not preferably overwrite the old configurator files, but rather the edited configurator files are preferably stored as a separate version number of the files, and the old files retained. Here the system will often automatically increment the file version number. Thus for example, CSV file version 1132 will upon editing be saved as a new CSV file version 1133, and the old CSV file version 1132 will be retained.

This form of configurator version control is highly important. This is because configuators may be used for a long period of time, and be periodically incremented. A customer user (1114) may thus end up configuring an ordered product using an earlier configurator file version. In order to properly recreate the customer product selection, both the configurator options chosen by the customer, and the configurator version used by the customer, are thus needed.

To simplify the user interface, in edit mode, often the additional editor commands will be somewhat hidden from the merchant user editing the configurator in order for the merchant user to better appreciate the effect that his or her changes are having on the overall appearance and function of the configurator. This can be conveniently be done by showing various command buttons when the merchant user moves his or her mouse over an editable element of the configurator.

Figure 13:
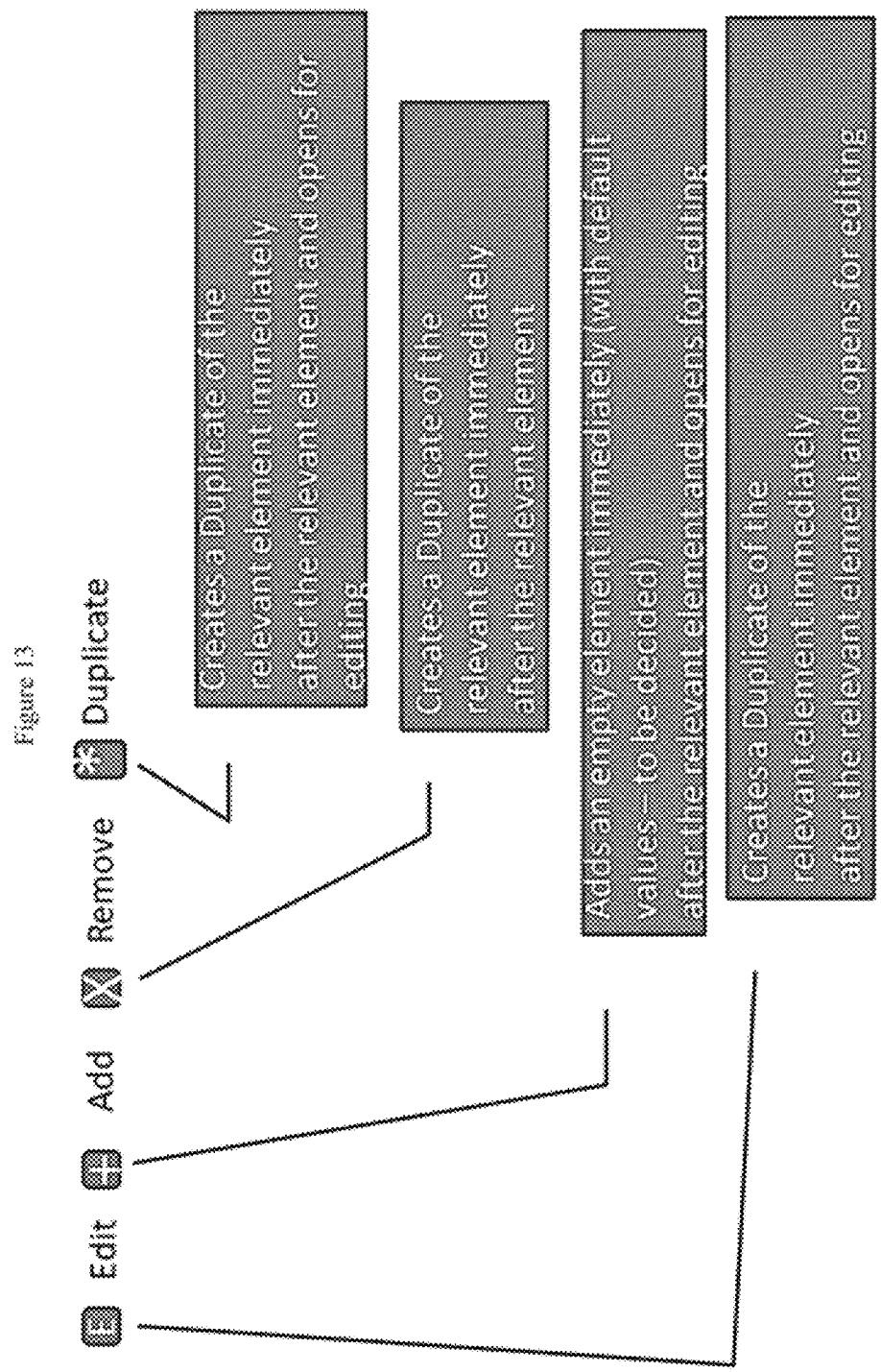
FIG. 13 shows a detail of some of the remote configurator editor control buttons.

In this embodiment, the remotely edited configurator user interface is controlled by a small number of general commands, here exemplified by the "E", "+", "X" buttons and optional "*" buttons, which are shown in FIG. 13

Figure 14:
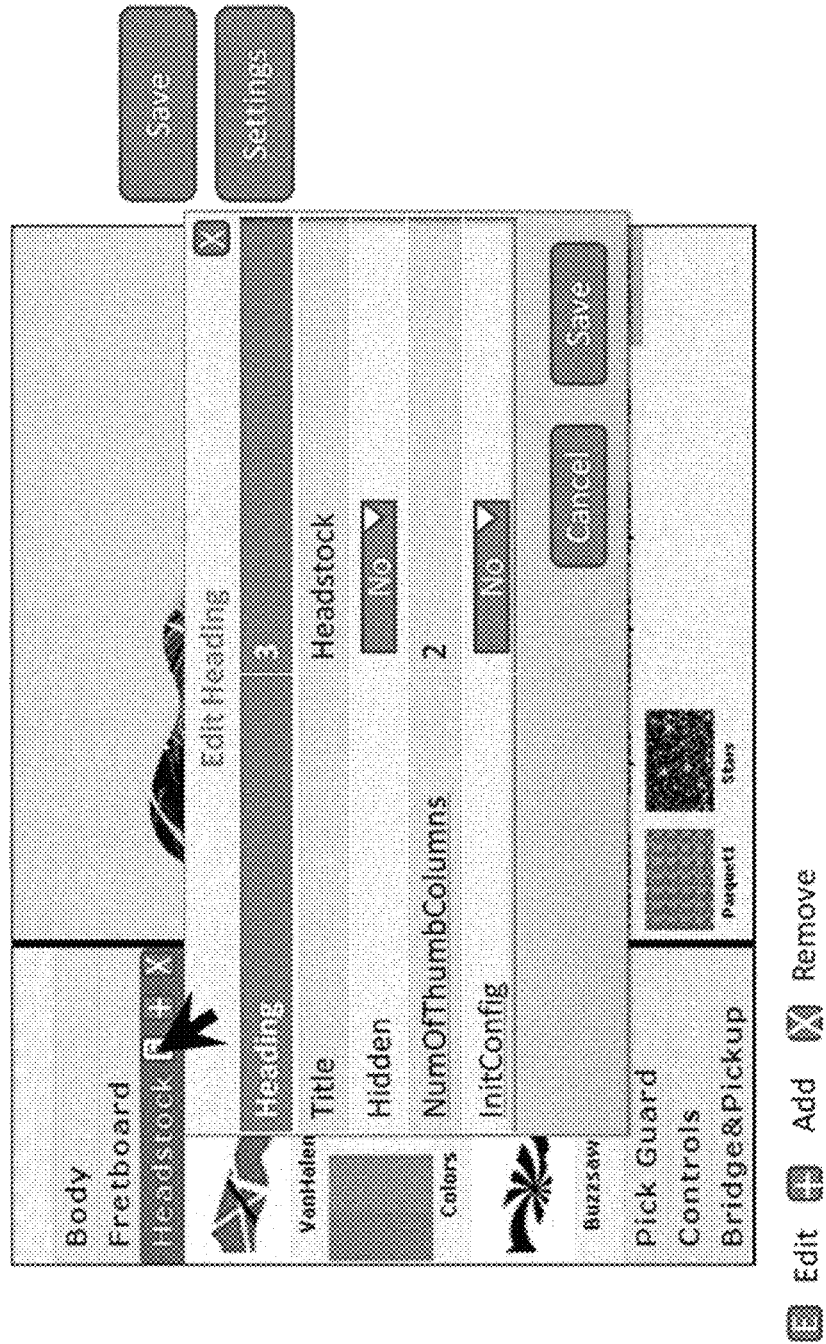
FIG. 14 shows a user interface for a WYSIWIG remote configurator file editor running in a remote web server, showing an edit heading dialog box.

As shown in FIG. 14, these general configurator commands can be applied to any configurator assembly attribute (e.g. the heading, assembly, attribute parameters). Using these four buttons, the user can make the following changes:

The "E" (edit) button allows headings, assemblies and attributes to be edited by a dialog box.

The "+" (add) button allows the user to add a new heading, assembly, or attribute. In a preferred embodiment, this new heading, assembly, or attribute may be located in the configurator data structure immediately after the previous configurator element as shown in the user interface.

This new heading, assembly, or attribute may initially be populated with system or user selected default values, and these values then may be edited by the user using an edit dialog box as before.

The "X" (remove) button allows the user to remove any heading, assembly, or attribute.

The optional "*" button allows the user to make a duplicate of an existing heading, assembly, or attribute. This duplicate heading, assembly, or attribute will preferably be created in the configurator data structure immediately after the previous heading, assembly, or attribute as shown on the user interface. In essence the "*" duplicate button acts similarly to the "+" adding button command, but with the difference being that here the various characteristics are initially taken from the duplicated heading, assembly, or attribute, rather than from system default characteristics. This can simplify the editing process since often a user will want to have the new heading, assembly, or attribute have many of the characteristics of the previous heading, assembly, or attribute, with the exception of a few minor alterations, which can then be edited in.

FIG. 14 shows an example of how a configurator heading may be remotely edited using this type of remote user interface. Here the relevant fields and their values are shown in a dialog box, and these may be selected or modified by the remote user as desired.

Figure 15:
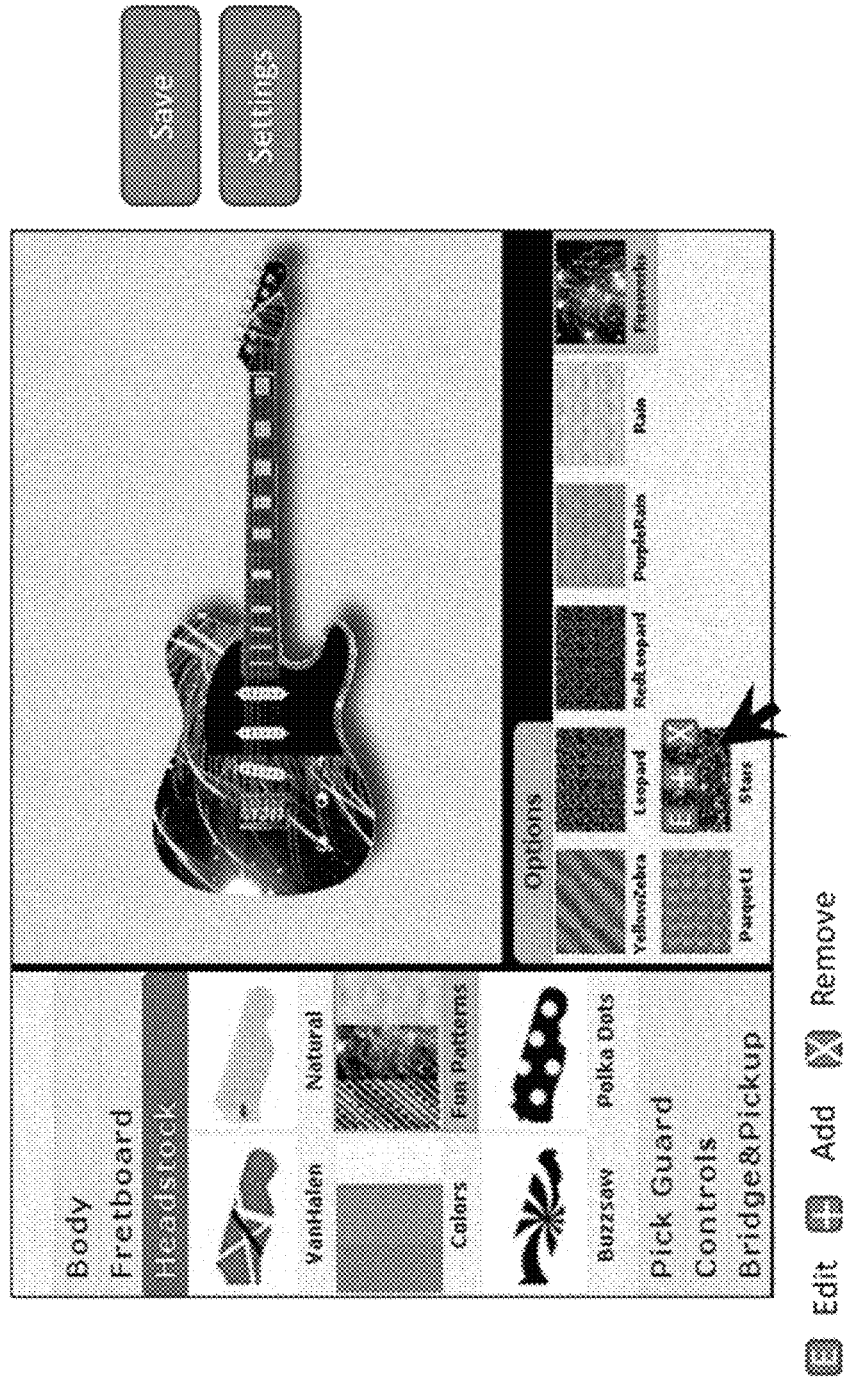
FIG. 15 shows the beginning steps of selecting and editing a configurator "stars" attribute.

FIG. 15 shows how this method may be used to edit or control a configurator attribute. Here again, the remote user has placed the mouse over the "stars" attribute, exposing the various control buttons (e.g. "E", "+", "X") again.

Figure 16:
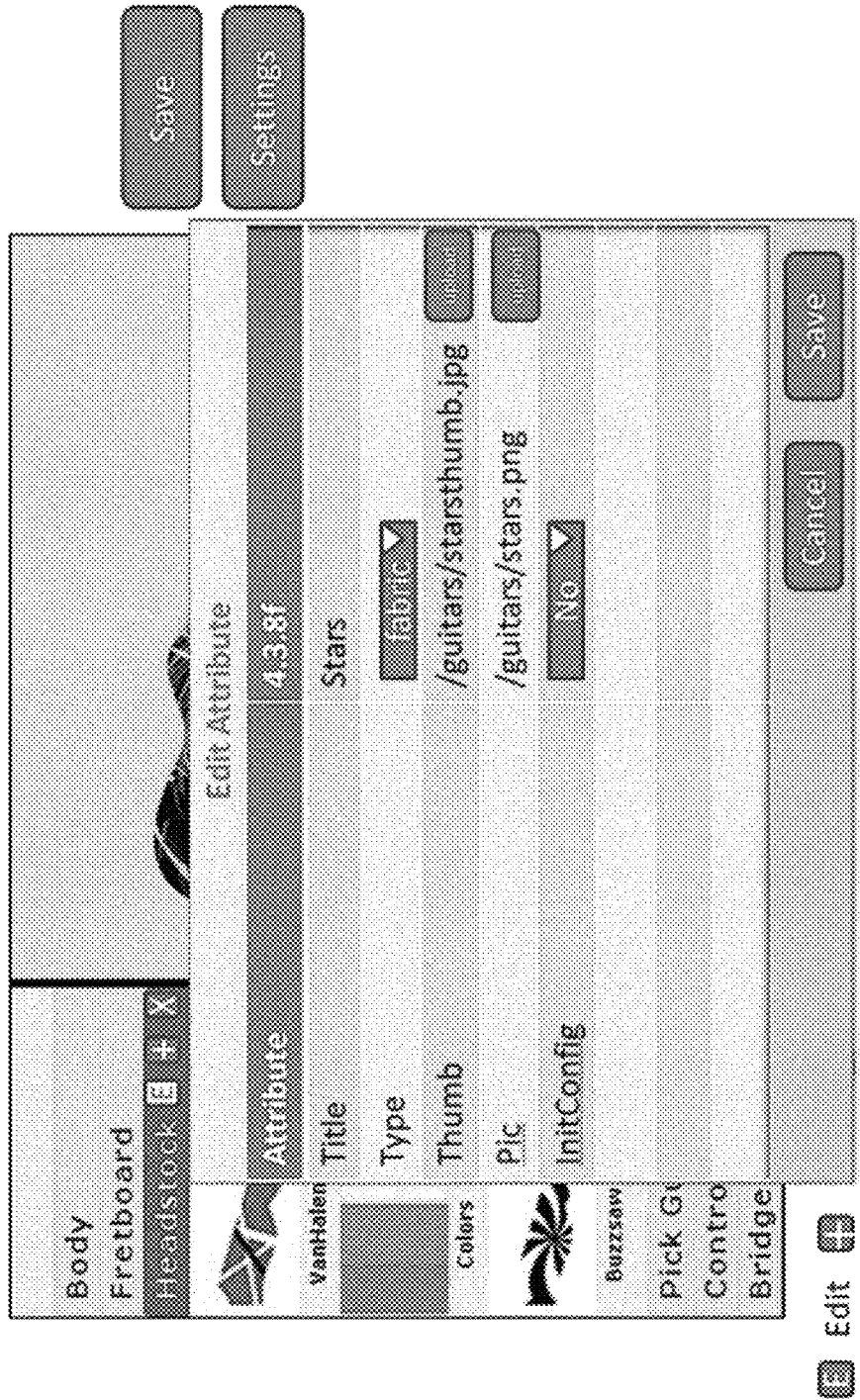
FIG. 16 shows a later step of editing the fields of the "stars" configurator attribute in an edit attribute dialog box.

FIG. 16 shows that selecting the "E" (edit) button opens the edit attribute dialog box, and again allows the user to edit the characteristics of this particular configurator "stars" attribute.

Figure 17:
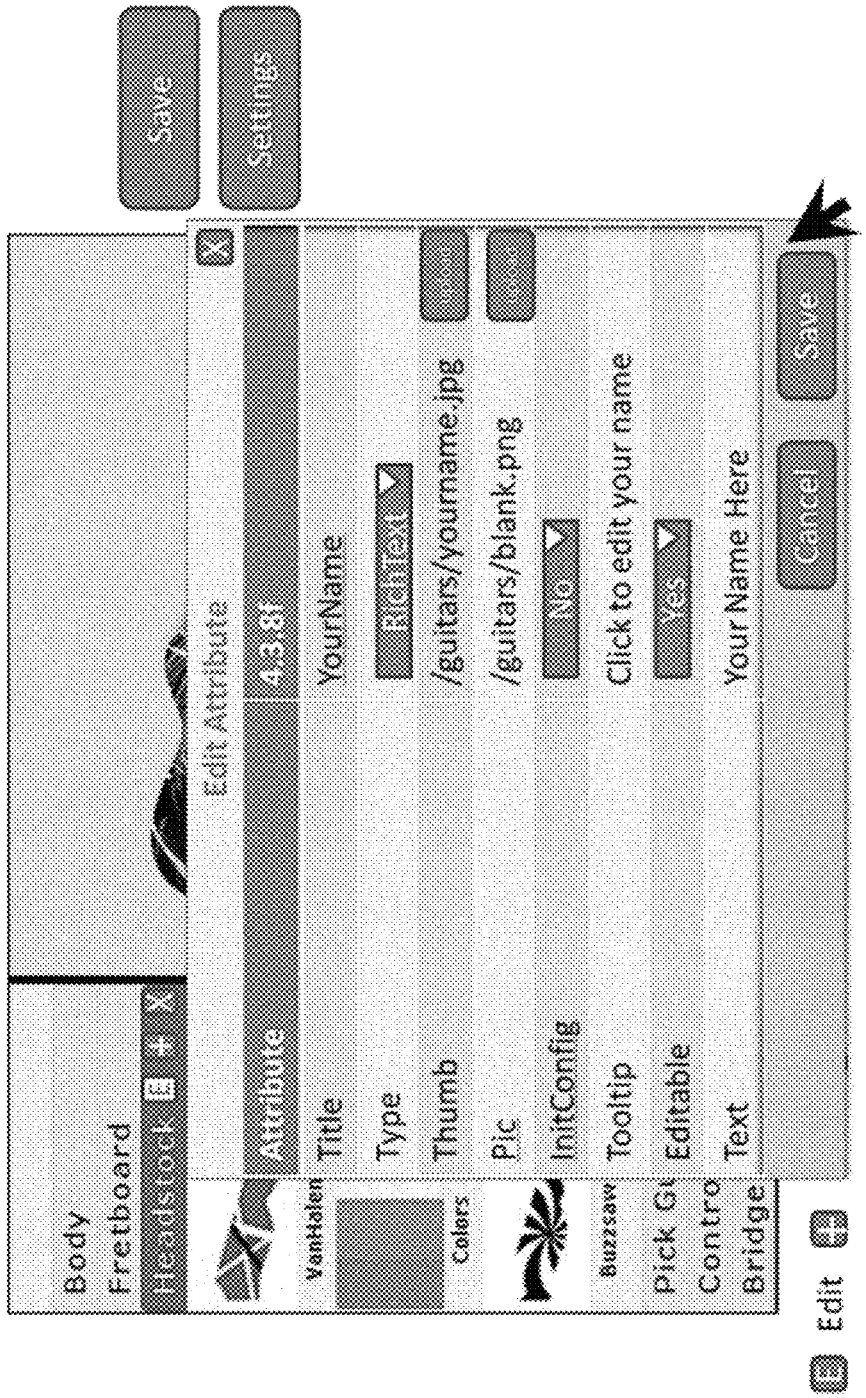
FIG. 17 shows an alternate way to create a new attribute by using the remote configurator editor "+" (add) command.

By contrast, FIG. 17 shows that selecting the "+" (add) button instead opens up an edit attributed dialog box filled with various system default values.

In a preferred embodiment, the remote configurator system will immediately reflect all user configurator changes to all configurator views, so that the user can judge if a particular change is acceptable or not before clicking on the save button. This preserves the WYSIWYG (what you see is what you get) functionality of the remote configurator editor.

All configurator fields will generally have a user interface with suitable data inputting and formatting logic appropriate for the type of configurator database field being edited. Thus some configurator fields will be handed as free text fields, while other fields that have a limited number of permissible user options may be handled by other formats such as drop down selections.

The editing dialog box view/window where user makes changes to the parameters will preferably be both user draggable and resizable, and have scrollbars when needed, so that the user can position the dialog box in an appropriate portion of the user interface screen. Additionally, in a preferred embodiment, the merchant user will also be able to change the order of thumbnail images and headings using, for example, drag and drop methods, and/or changing the value of the item number in the relevant edit attribute dialog box. Thus, for example, if the online user changes a particular configurator heading "heading number" from a later heading number (e.g. 4) to an earlier heading number (e.g. 2), the edited configurator heading will be now be shown on the configurator user interface as inserted earlier (e.g. moved up to heading 2, and the system will adjust the other configurator heading numbers accordingly). Configurator icons and thumbnail images may also be repositioned in a similar manner (e.g. either by drag and drop repositioning, or by editing the particular database number field of the selected icon or thumbnail image.

Standard help methods may also be implemented. For example, each parameter name may have a small question mark or other type of help icon next to it. When user clicks on the help icon, a help window can then appear that has help details about that specific parameter.

Revision Control.

As previously discussed, each time the merchant user remotely updates the configurator files, the system automatically preserves the older version under the older version number, and saves the changed configurator files as an updated version number. In addition to allowing an "undo" feature, this option is critical for routine configurator use. This because the configurator will tend to be periodically updated by the merchant user. At the same time, customer users will be making purchases using earlier versions of the configurator, and will be configuring their particular products under a particular earlier version of the configurator. Thus in order for the merchant user to then accurately produce a particular purchased good or item according to the customer user's configuration, both the particular purchase configuration item selections, and the version number of the configurator used by the customer, must be known. One way to do this is to embed both the configurator selection options and the configurator version number into the same URL. The customer user or other user can then transmit the URL, and the merchant's server or other server can then parse this URL, determine the selected configurator options and the configurator version number used, and then show the ordered item, or otherwise handle the ordered item. As a result, the same item configuration can be described by a variety of different URLs, often at least one per configuration option and configurator version number used.

FIGS. 18 to 25 show another example of this web browser based remote configurator editing system and method, here using a "live" and running basketball uniform configurator.

Figure 18:
FIG. 18 shows an additional example of remotely editing a configurator for a basketball uniform.
Figure 19:
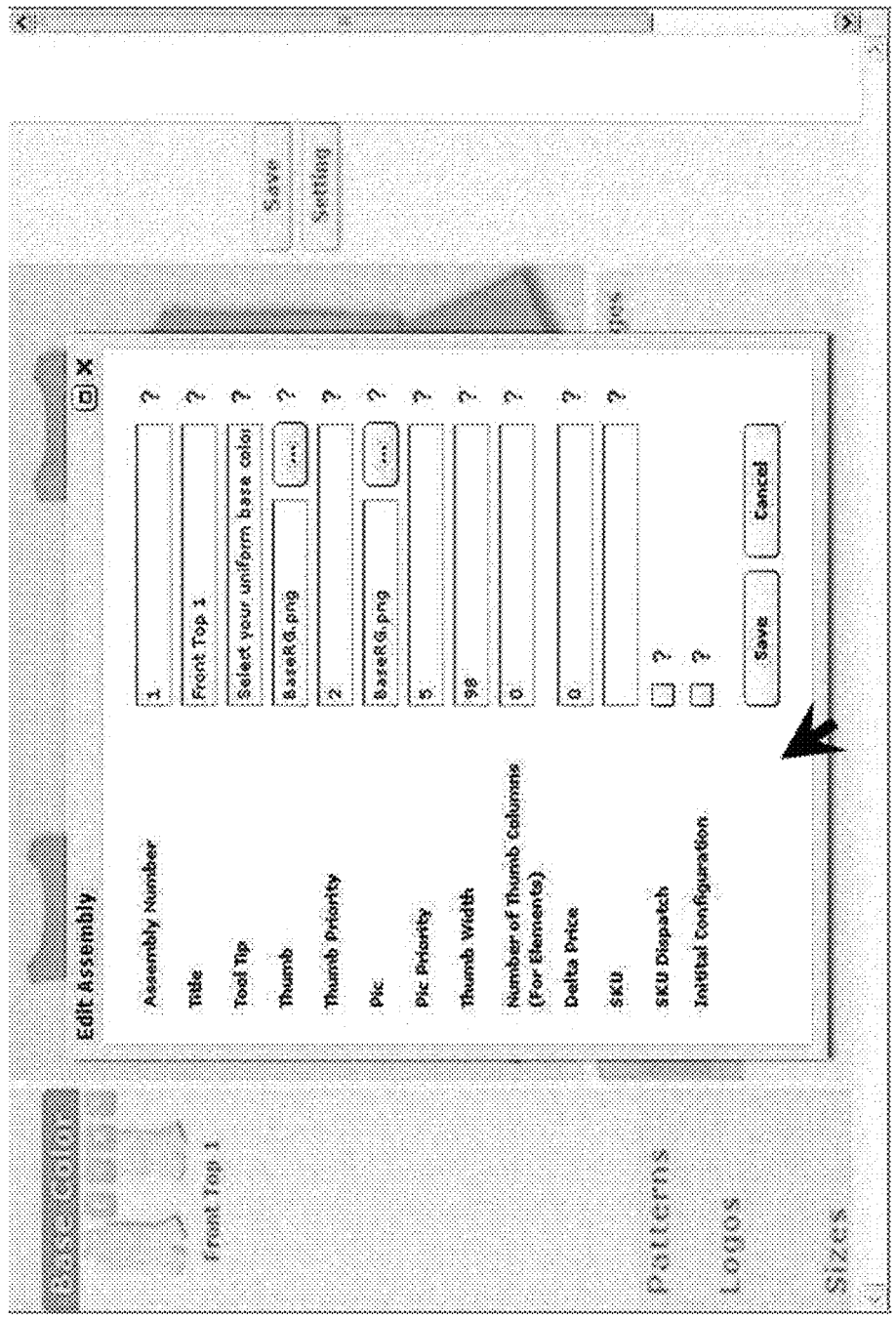
FIG. 19 shows remotely editing an assembly of the basketball uniform configurator.

FIG. 18 shows the "E, +, X, *" control buttons being used by the merchant user to edit an assembly item of a basketball uniform configurator. As before, mousing over the desired assembly item exposes the control button interface, and clicking on the "E" (edit) button then provides a configurator edit assembly dialog box for this item, which is shown in FIG. 19. The question marks on each field are used to bring up the help menu for that particular item (not shown).

Figure 20:
FIG. 20 shows selecting the configurator heading of the basketball uniform configurator for further remote editing.

In FIG. 20, the merchant user has moused over a configurator heading item, thus now exposing the remote configurator editor control button interface.

Figure 21:
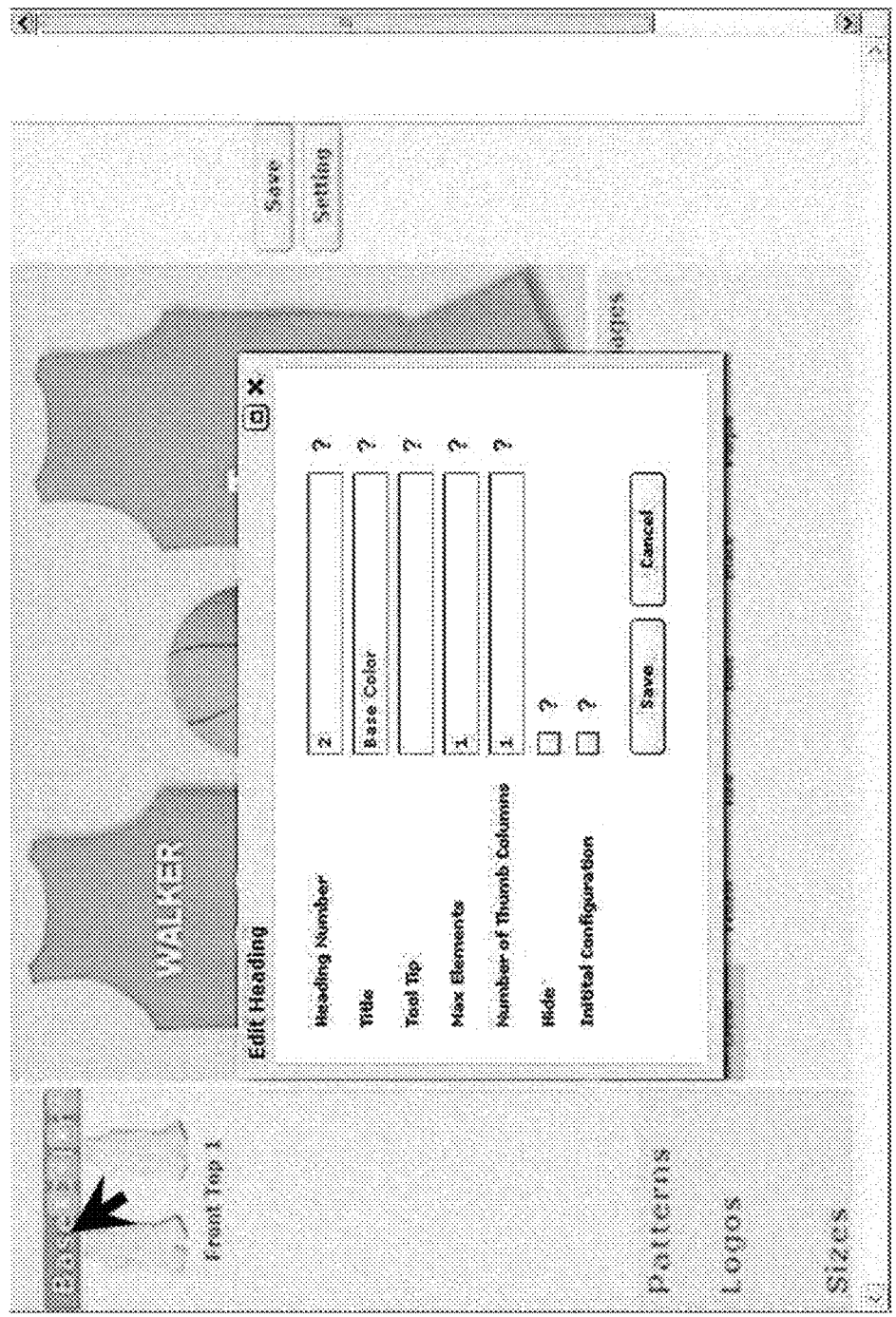
FIG. 21 shows remotely editing this configurator heading in a dialog box.

In FIG. 21, the user has also clicked on the "E" (edit) button, thus also providing the configurator edit heading dialog box.

Figure 22:
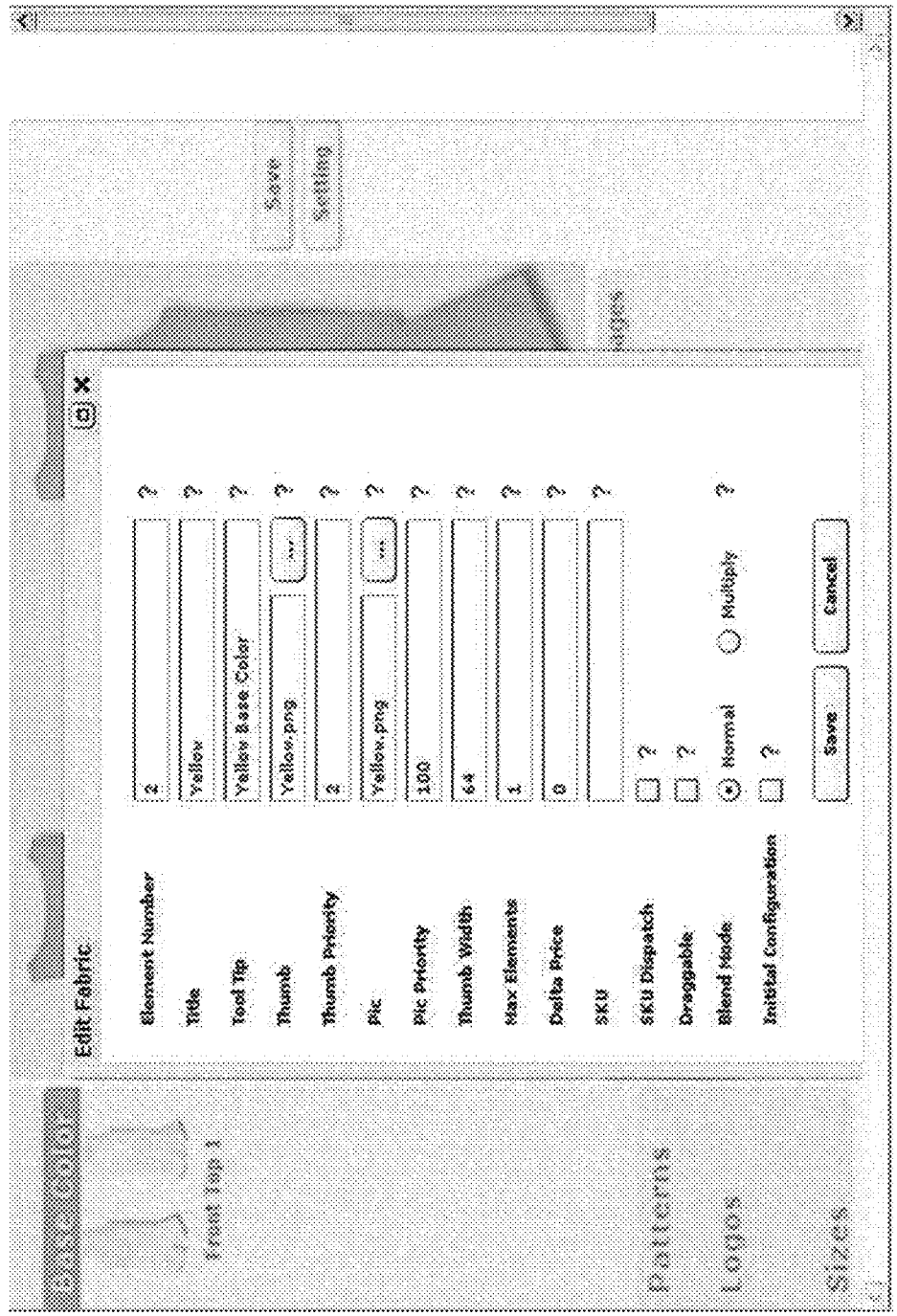
FIG. 22 shows editing a fabric attribute in a dialog box.

In FIG. 22, the user is also editing the configurator fabric selection via an appropriate dialog box.

Figure 23:
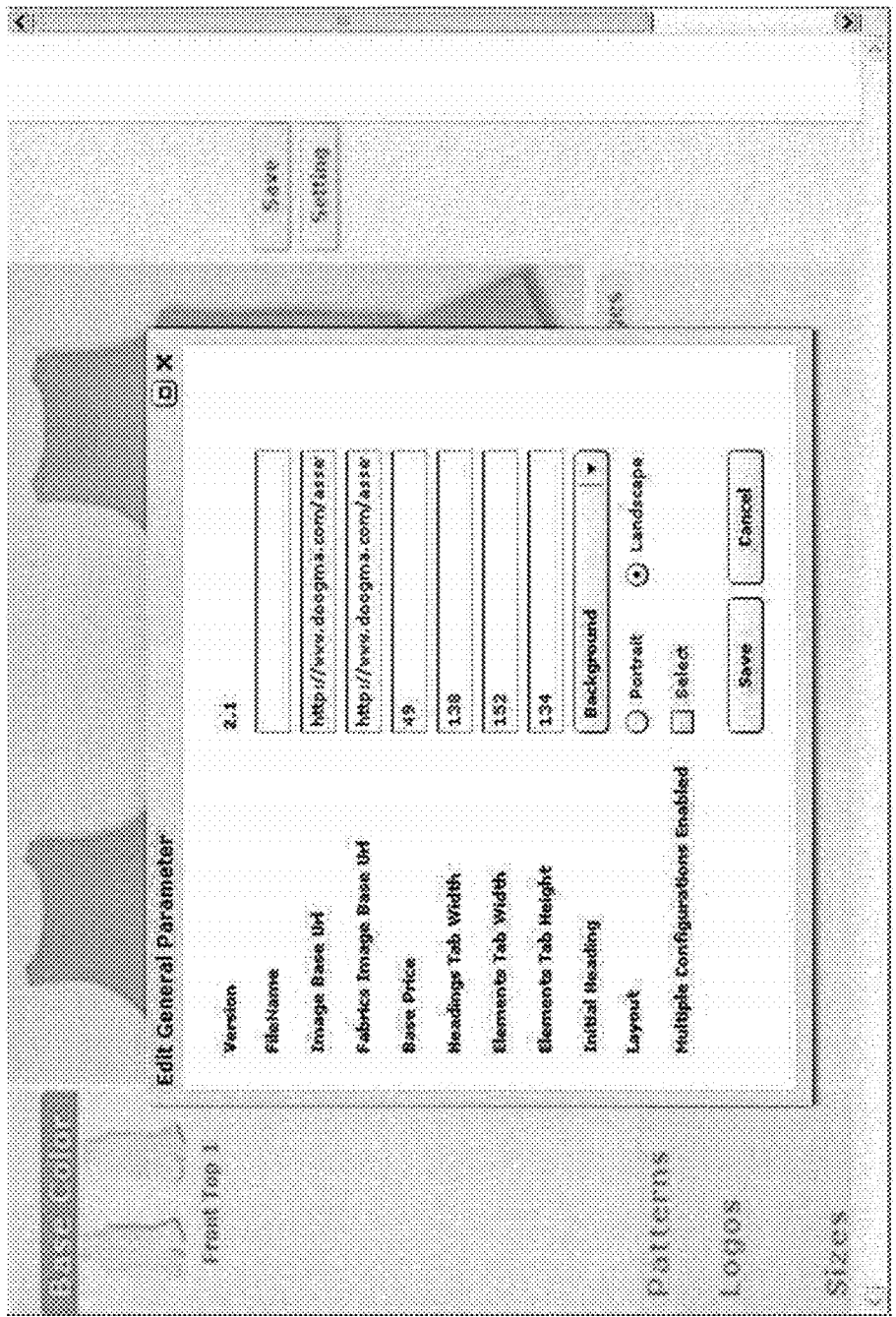
FIG. 23 shows remotely editing the general parameters of the basketball uniform configurator.

In FIG. 23, the user is also editing general configurator parameters, such as the price of the basketball uniform, appearance of the various tabs, configurator background image, and the like.

Figure 24:
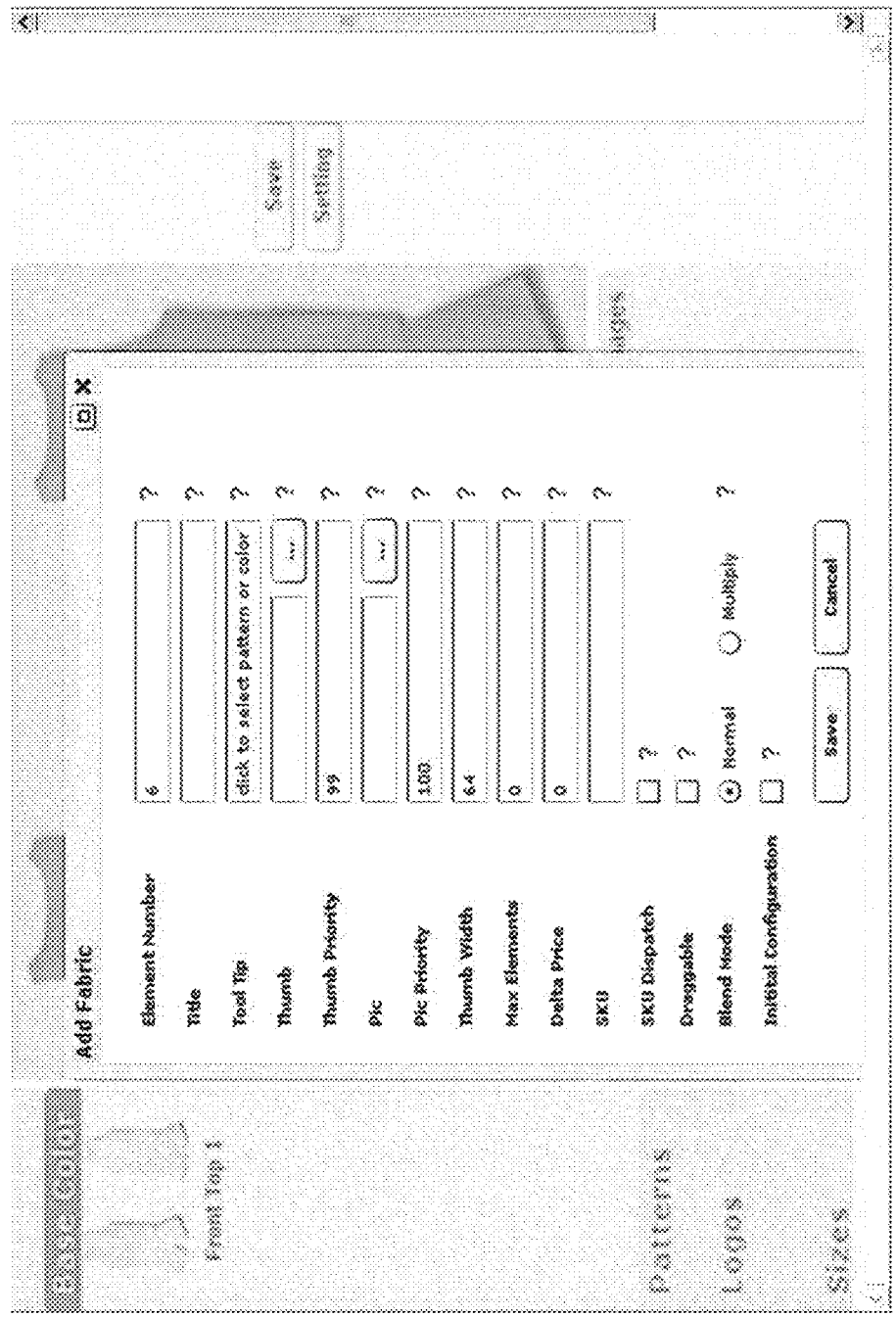
FIG. 24 shows remotely adding a new fabric attribute to the basketball uniform configurator.

In FIG. 24, the user is adding additional uniform fabric selections to the configurator via the dialog box. Here the dialog box is populated with only a few system default selections.

Figure 25:
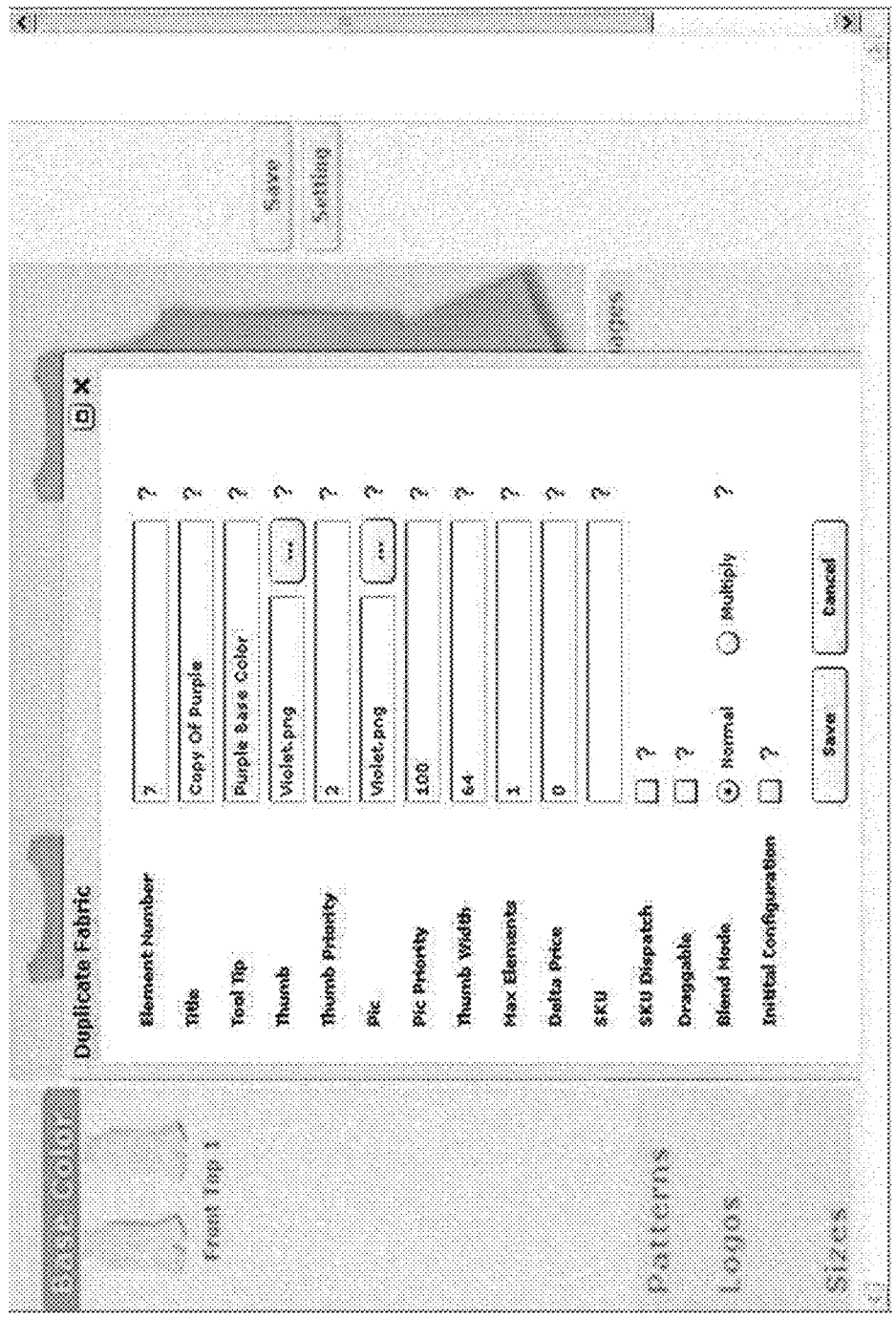
FIG. 25 shows an alternate process of adding a new fabric attribute to the basketball uniform configurator using the duplicate command.

In FIG. 25, the user has decided to add another fabric by an alternate and often easier method in which he duplicates an existing fabric, thus populating the default configurator fields with the property of the original fabric. The user then may edit only those fields that he wants to change for the new fabric, and otherwise save effort by reusing the other parameters from the original fabric.

Importing Configurator Data Directly from an Adobe Photoshop File.

Adobe Photoshop, and its associated .psd file format, are widely used in graphical arts and the advertising industry. The Adobe .psd file format stores Photoshop image data as a series of layers. Since the configurator is also layer oriented, in some embodiments, Adobe Photoshop .psd, or other layer oriented graphical files of an item of interest may be used to help populate the configurator database for the configurator of that item of interest.

To facilitate the process of converting layer oriented graphical file formats into configurator database files; one or more wizards may be used. In view of the popularity of the .psd file format, here an import .psd wizard is used as a particular example.

A .psd oriented graphical file format configurator import wizard can, for example, enable auto import from various types of Graphics Editing Software such as Adobe Photoshop. This import wizard can either be hosted on the Doogma server or other configurator hosting server, or it can be provided as a downloadable application and used on the merchant user's computer or computerized device.

Here, the merchant user will provide the desired layered graphic (e.g. .psd) file to the system, either by uploading or other method, and then open the graphic file in the wizard. The wizard can then display all layers in the graphic. The user can then assign these various layers to various configurator categories (e.g. heading, assembly, and attribute) by a manual process by either editing the various values, or alternatively dragging and dropping the various image layers into the desired configurator positions.

In some embodiments, this graphic file import wizard can either be provided by the configurator hosting website along with the remote configurator editor also provided by the configurator hosting website. Alternatively, the graphic file wizard may be provided along with the graphics editing software itself, for example as an Adobe Photoshop plug-in. This would then provide all graphics editing features and configurator editor features in a single solution, which may either be hosted on a remote web server (e.g. the configurator hosting server) or locally on the merchant user's device.

Figure 26:
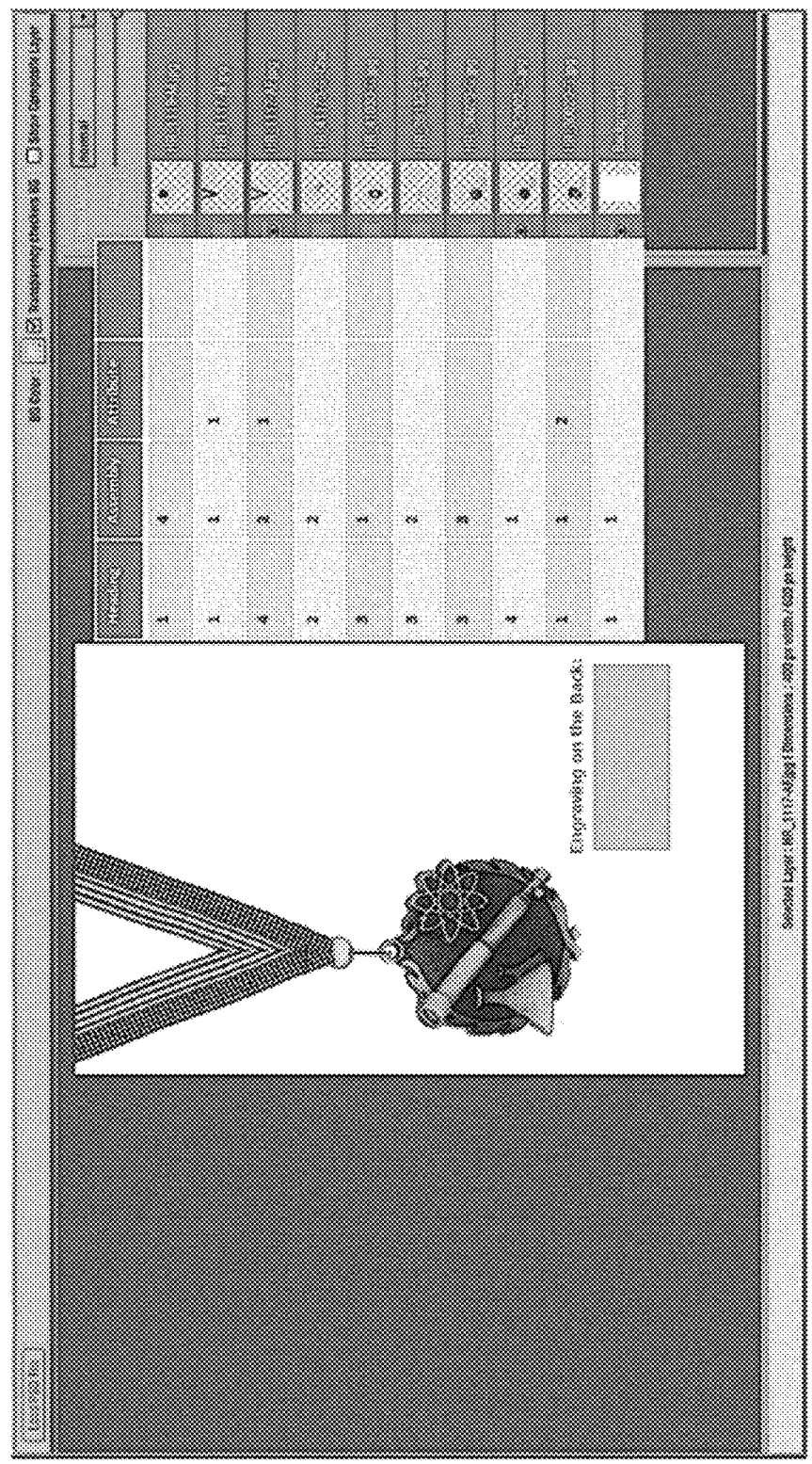
FIG. 26 shows an example of an import wizard for a graphic layer based image format such as a .psd graphic layer based image format.

FIG. 26 shows an example of this configurator graphic file wizard in operation. In this example, the merchant user desires to create configurator for a particular type of necklace or medallion, and has imported (or uploaded to the server hosting the wizard) a graphic .psd file of the necklace showing multiple necklace design options. The wizard has imported the file, is showing the file, and is also showing the various image layers.

Here, the various layers that the wizard imported from the layered graphics file (e.g. .psd file) are shown as (xx). The wizard also opens up a window (here shown on the left as xx) that shows the various configurator heading, assembly, and attributes that the various graphics file layers can be potentially assigned to. The wizard can be designed with some intelligence so that, based on internal design and parsing rules, it can make initial suggestions as to the wizard's understanding as to how the various layers can be parsed into particular configurator data fields in order to produce the resulting image.

The merchant user can then take the wizard's suggested assignments, and edit them as needed according to the merchant' user's needs and the sophistication of the wizard. The wizard can either preserve the original .psd layer names, renumber the original layers, or suggest names according to internal rules. The wizard can also allow the merchant user to modify these names as desired.

As before, the configurator editor, graphics editing software, and suitable wizards may be configured into a single solution that may be either provided by remote hosting (e.g. a remote configurator server) or run locally on the merchant user's computer as desired.

Figure 27:
FIG. 27 shows an example of how the saved configuration added to a URL may look in a browser window when enabling a user to share a saved configuration via email or on a social network.

FIG. 27 shows an example of how the saved configuration added to a URL may look in a browser window when enabling a user to share a saved configuration via email or on a social network.

Further examples of the user interface for the configurator editor system may be found in U.S. provisional application 61/674,831, the contents of which are incorporated herein by reference.

Use for Collections:

It is sometimes advantageous in e-commerce to sell products that can "go together" as a collection or bundle of products. This is because consumers may often be encouraged to buy more than one item if they see those items displayed simultaneously within a single picture. For example, when displaying a lady's blouse, additional items may also be offered such as a matching handbag, jewelry, skirt, shoes or the like. As another example, when displaying a sofa, additional items for the living room may be also displayed for sale within the same picture, such as matching chairs, rugs, tables, decorative cushions, and the like.

Here, the methods of the present disclosure may also be used to sell collections of products multiple where each such item can be interchanged. Thus returning to the lady's blouse example above, the prospective purchaser can virtually interchange various handbags online, and the system can generate and the user receive images that allow the prospective purchaser to immediately see what the combination of the blouse and handbag looks like, and assess how this combination visually matches together with the selected outfit.

In general, the same techniques previously described that allow users to configure single items can also enable users to configure multiple items as a single collection of items.

Here, however, the user can see how the various multiple items go together, and when happy with the collection, the user can then select which items to purchase.

Thus the invention's configurator editor methods enable designers to create their own "themes" or collections of items that go together, and also enables customers to play with these collections; picking and choosing among various options to see which assembly of items in the collection are most to the customer's liking. The configurator system may also be programmed to make various suggestions, calculate relative costs, and the like as needed.

In some embodiments, the invention's configurator editor methods may be used to create collections or bundles of items, where the underlying item file data may be obtained or otherwise collected from multiple alternative websites. Thus, using these methods, a merchant user may, for example, collect items of interest from multiple websites, and form them into bundles. Consumer users in turn can select items of interest from these collections or bundles, and purchase or select according to the previously discussed methods.

Note that in some embodiments, some or all of the various items may not themselves be configurable on an individual basis. However when a plurality of items are shown, this plurality of items may be configurable as a bundle of products the user can choose, along with existing (non configurable) items the user wishes to add to his bundle Thus, for example, in a room bundle with a plurality of different items, several different couches may be available, and several different carpets may also be available. Although each individual couch and carpet may not necessarily be configurable or customizable, the user still can use the techniques of the present invention to configure his or her own version of the bundle of items.

Review of Certain Key Points:

Thus to summarize, in some embodiments, the invention may employ one or more of various different data structure formats such as xml, csv, and database structures. These data structures will generally comprise headings, assemblies, and attributes organized into one convenient data structure.

The invention's configurator editor allows a seller or any one with proper editor authorization to edit the configurator either locally or remotely. Due to the unique methods described herein, a relatively low level of computer skills can be used to edit the configurator and little or no programming or coding need be done.

The invention claimed is:

1. A method of creating an item configurator or bundle configurator, for at least one item, intended to run under the control of at least one processor in at least one computerized device possessing a GUI, said method comprising:

creating a plurality of graphic layer files and graphic layer thumbnail files comprising various layers of said at least one item;

wherein at least some of said plurality of graphic layer files contain some transparent pixels;

wherein at least some of the graphic layer files have the same width and height dimensions in terms of pixels, so that these graphic layer files may be superimposed on each other to produce a composite image without the need to specify the relative location of any particular graphic layer file relative to another particular graphic layer file;

creating at least one main table structure file describing the relationships between said plurality of graphic layer files;

said main table structure file comprising a plurality of heading sections;

each heading section comprising a heading and at least one assembly definitions;

each at least one assembly definition comprising and being associated with at least one graphic layer file, at least one thumbnail graphic layer file (icon), at least one assembly title descriptor, and an optional link to an associated file or data structure that defines the attributes of said at least one assembly definition;

obtaining an interactive generic configurator program (IGCP);

said IGCP capable of reading and parsing said at least one main table structure file, and implementing a program loop wherein for each heading section in said at least one main table structure file, said IGCP will:

1: read said heading and display said heading onto said GUI;

2: read the first assembly definition or the default assembly of each heading and display the graphic layer file associated with said assembly definition into a GUI configurable object display window;

3: read said at least one assembly definition wherein;

A: if said assembly definition contains a link to an associated data structure, then said IGCP will apply the attributes associated with this associated data structure to the at least one graphic layer file associated with said assembly, and display said attributes in a GUI attribute display window as additional attributes that may be applied should the user click on one of these attributes in the GUI attribute display window;

B: For each assembly definition, said IGCP will display said thumbnail graphic layer file as an icon associated with said display of said heading onto said GUI, and display said at least one assembly title descriptor associated with said display of said heading onto said GUI;

wherein if a user of said configurator selects an icon on said GUI, said IGCP will replace the associated graphic layer files in the at least one item configuration window with new graphic layer files associated with said selected icon, and apply the defined attributes specified by the linked associated data structure associated with said icon onto the assembly, and 4: when said user indicates on said GUI interface that said user is finished, said IGCP will save a record of the assemblies and attributes selected by said user wherein the main table structure file is produced by an automated scripting program that produces said main table structure file in response to a designer's selection of configurator options and modes of operation on a graphical user interface, wherein said IGCP comprises a plugin or add on for another software program.

2. The method of claim 1, wherein said attributes are selected from the group consisting of colors, patterns, textures, fabrics, materials, editable text and available sizes.

3. The method of claim 1, wherein at least some of said assembly definitions and/or attribute definitions additionally comprise one or more codes representing a price category that can be used to calculate and display the impact of choosing said assembly definition on the at least one price of said at least one item.

4. The method of claim 1, wherein at least some of said assembly definitions additionally comprise one or more interdependency codes that either disable use of other assembly definitions if said assembly definition is chosen by said user, or disable use of said assembly definition if the use of other assembly definitions are chosen by said user.

5. The method of claim 1 used on an Internet based server-web browser ecommerce system;
wherein said IGCP runs in a user's web browser;
at least some of said plurality of graphic layer files are stored in a web server; and
said record of the icons selected by said user is stored on said web server.

6. The method of claim 5, wherein at least some assembly description files and graphic layer files, corresponding to third party item options, are supplied by one or more third party suppliers; and
said third party item options are included in an ecommerce shopping cart or order form so that if a user selects one or more of said third party item options, such items can be delivered by the seller of the third party items to the customer or alternatively, an automatic notification can be sent to said one or more third party suppliers to provide said third party item options items to the manufacturer or assembler of the at least one item prior to shipment of the finished at least one item.

7. A method of creating an item configurator or bundle configurator, for at least one item, intended to run under the control of at least one processor in at least one computerized device possessing a GUI, said method comprising:
creating a plurality of graphic layer files and graphic layer thumbnail files comprising various layers of said at least one item;
wherein at least some of said plurality of graphic layer files contain some transparent pixels;
wherein at least some of the graphic layer files have the same width and height dimensions in terms of pixels, so that these graphic layer files may be superimposed on each other to produce a composite image without the need to specify the relative location of any particular graphic layer file relative to another particular graphic layer file;
creating at least one main table structure file describing the relationships between said plurality of graphic layer files;
said main table structure file comprising a plurality of heading sections;
each heading section comprising a heading and at least one assembly definitions;
each at least one assembly definition comprising and being associated with at least one graphic layer file, at least one thumbnail graphic layer file (icon), at least one assembly title descriptor, and an optional link to an associated file or data structure that defines the attributes of said at least one assembly definition;
obtaining an interactive generic configurator program (IGCP);
said IGCP capable of reading and parsing said at least one main table structure file, and implementing a program loop wherein for each heading section in said at least one main table structure file, said IGCP will:
1: read said heading and display said heading onto said GUI;
2: read the first assembly definition or the default assembly of each heading and display the graphic layer file associated with said assembly definition into a GUI configurable object display window;
3: read said at least one assembly definition wherein;
A: if said assembly definition contains a link to an associated data structure, then said IGCP will apply the attributes associated with this associated data structure to the at least one graphic layer file associated with said assembly, and display said attributes in a GUI attribute display window as additional attributes that may be applied should the user click on one of these attributes in the GUI attribute display window;
B: For each assembly definition, said IGCP will display said thumbnail graphic layer file as an icon associated with said display of said heading onto said GUI, and display said at least one assembly title descriptor associated with said display of said heading onto said GUI;
wherein if a user of said configurator selects an icon on said GUI, said IGCP will replace the associated graphic layer files in the at least one item configuration window with new graphic layer files associated with said selected icon, and apply the defined attributes specified by the linked associated data structure associated with said icon onto the assembly using an algorithm wherein said algorithm is associated with at least one of multiply, overlay, or dissolve, and
4: when said user indicates on said GUI interface that said user is finished, said IGCP will save a record of the assemblies and attributes selected by said user, wherein at least some of said assembly definitions and/or attribute definitions additionally comprise one or more codes representing a price category that can be used to calculate and display the impact of choosing said assembly definition on the at least one price of said at least one item.

8. The method of claim 7, wherein said attributes are selected from the group consisting of colors, patterns, textures, fabrics, materials, editable text and available sizes.

9. The method of claim 7, wherein at least some of said assembly definitions additionally comprise one or more interdependency codes that either disable use of other assembly definitions if said assembly definition is chosen by said user, or disable use of said assembly definition if the use of other assembly definitions are chosen by said user.

10. The method of claim 7 used on an Internet based server-web browser ecommerce system;
   wherein said IGCP runs in a user's web browser;
   at least some of said plurality of graphic layer files are stored in a web server; and
   said record of the icons selected by said user is stored on said web server.

11. The method of claim 10, wherein at least some assembly description files and graphic layer files, corresponding to third party item options, are supplied by one or more third party suppliers; and
   said third party item options are included in an ecommerce shopping cart or order form so that if a user selects one or more of said third party item options, such items can be delivered by the seller of the third party items to the customer or alternatively, an automatic notification can be sent to said one or more third party suppliers to provide said third party item options items to the manufacturer or assembler of the at least one item prior to shipment of the finished at least one item.

* * * * *